US012787068B2

(12) United States Patent
Patchava et al.

(10) Patent No.: US 12,787,068 B2
(45) Date of Patent: Nov. 3, 2026

(54) RO DESIGN FOR PRACH REPETITION

(71) Applicant: QUALCOMM Incorporated, San Diego, CA (US)

(72) Inventors: Raviteja Patchava, San Diego, CA (US); Jing Sun, San Diego, CA (US); Jing Jiang, San Diego, CA (US); Yan Zhou, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 262 days.

(21) Appl. No.: 18/665,459

(22) Filed: May 15, 2024

(65) Prior Publication Data

US 2025/0358855 A1 Nov. 20, 2025

(51) Int. Cl.

*H04W 74/0833* (2024.01)
*H04L 1/18* (2023.01)
*H04W 56/00* (2009.01)

(52) U.S. Cl.

CPC ........... *H04W 74/0833* (2013.01); *H04L 1/18* (2013.01); *H04W 56/002* (2013.01)

(58) Field of Classification Search

None

See application file for complete search history.

(56) References Cited

U.S. PATENT DOCUMENTS 12,245,285 B2 * 3/2025 Lei .................... H04W 74/0833
2022/0287103 A1 * 9/2022 Cozzo ................. H04W 74/002
2024/0364460 A1 * 10/2024 Liu ................... H04W 74/0833
2024/0381434 A1 * 11/2024 Kim ...................... H04W 48/12
2026/0075658 A1 * 3/2026 Han .................. H04W 74/0833
2026/0181699 A1 * 6/2026 Yao ................... H04W 74/0833

FOREIGN PATENT DOCUMENTS

WO 2023164834 A1 9/2023
WO 2024073985 A1 4/2024

OTHER PUBLICATIONS

International Search Report and Written Opinion—PCT/US2025/024680—ISA/EPO—Aug. 20, 2025.

Zhang Y (Lenovo)., et al., "PRACH Coverage Enhancements", R1-2300860, 3GPP TSG RAN WG1 Meeting #112, Athens, Greece, Feb. 27-Mar. 3, 2023, 3rd Generation Partnership Project, Mobile Competence Centre, 650, Route Des Lucioles, F-06921 Sophia-Antipolis Cedex, France, vol. RAN WG1, No. Athens, GR; Feb. 27, 2023-Mar. 3, 2023, Feb. 17, 2023, pp. 1-9, XP052248003, figures 1, 2, 5, 6 section 2.1, p. 3-p. 6.

* cited by examiner

*Primary Examiner* — Xavier S Wong

(74) *Attorney, Agent, or Firm* — Procopio, Cory, Hargreaves & Savitch LLP/Qualcomm

(57) ABSTRACT

A method for wireless communication at a user equipment (UE) and related apparatus are provided. In the method, the UE receives, from a network entity, a random access occasion (RO) configuration for an RO bundle. The RO bundle includes a first number of ROs over a time range, and each RO of the first number of ROs occupies a first frequency range. The UE further transmits, using the RO bundle, a set of physical random access channel (PRACH) repetitions. The set of PRACH repetitions includes one or more preambles. The number of repetitions in the set of PRACH repetitions is less than or equal to the first number of ROs in the RO bundle, and each PRACH transmission uses one RO of the first number of ROs.

28 Claims, 15 Drawing Sheets

RO DESIGN FOR PRACH REPETITION

TECHNICAL FIELD

The present disclosure relates generally to communication systems and, more particularly, to the random access occasion (RO) design for physical random access channel (PRACH) repetitions in wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may include at least one memory and at least one processor coupled to the at least one memory. Based at least in part on information stored in the at least one memory, the at least one processor, individually or in any combination, may be configured to receive, from a network entity, a random access occasion (RO) configuration for an RO bundle including a first number of ROs over a time range, where each RO of the first number of ROs occupies a first frequency range; and transmit, using the RO bundle, a set of physical random access channel (PRACH) repetitions including one or more preambles. The number of repetitions in the set of PRACH repetitions is less than or equal to the first number of ROs in the RO bundle, and each PRACH transmission uses one RO of the first number of ROs.

In an aspect of the disclosure, a method, a computer-readable medium, and an apparatus are provided for wireless communication at a network entity. The apparatus may include at least one memory and at least one processor coupled to the at least one memory. Based at least in part on information stored in the at least one memory, the at least one processor, individually or in any combination, may be configured to transmit, for a UE, an RO configuration for an RO bundle including a first number of ROs over a time range, where each RO of the first number of ROs occupies a first frequency range; and receive a set of PRACH repetitions including one or more preambles on the first number of ROs. The number of repetitions in the set of PRACH repetitions is less than or equal to the first number of ROs in the RO bundle, and each PRACH transmission uses one RO of the first number of ROs.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
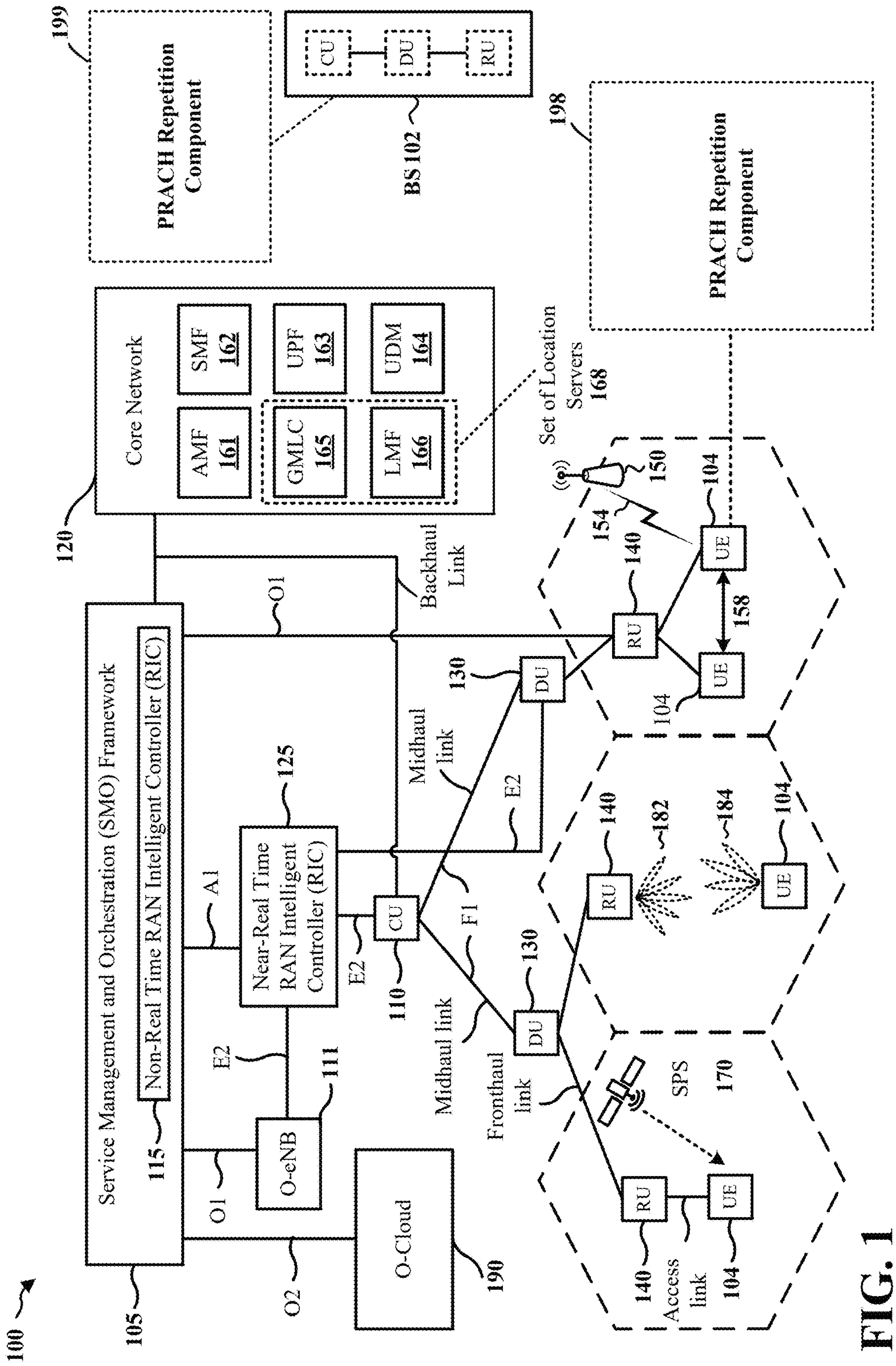
FIG. 1 is a diagram illustrating an example of a wireless communication system and an access network.

In wireless communication, user equipment (UE) may send a preamble message on a physical random access channel (PRACH) to initiate communication with a network (e.g., a base station). In situations where the network conditions are challenging, such as when the signal strength is low, or the interference is high, the UE may repeat the transmission of the preamble message multiple times, a process known as PRACH repetition, to enhance the reliability of the PRACH access attempts. In a PRACH repetition transmission, the UE may locate random access occasions (ROs) associated with the same synchronization signal block (SSB) that are adjacent in time and at the same frequency, and use those ROs to form the specified number of repetitions. Example aspects presented herein provide the mapping of ROs to SSBs that can support flexible RO repetitions.

Various aspects relate generally to wireless communication. Some aspects more specifically relate to the RO design for PRACH repetitions in wireless communication. In some examples, a UE may receive, from a network entity, an RO configuration for an RO bundle including a first number of ROs over a time range. Each RO of the first number of ROs may occupy a first frequency range. The UE may further transmit, using the RO bundle, a set of PRACH repetitions including one or more preambles. The number of repetitions in the set of PRACH repetitions is less than or equal to the first number of ROs in the RO bundle, and each PRACH transmission uses one RO of the first number of ROs. In some examples, the UE may receive, from the network entity, a transmission indicator of a set of preambles from the one or more preambles and a set of ROs from the first number of ROs for each PRACH repetition of the set of PRACH repetitions. The set of preambles may map to the set of ROs for each PRACH repetition of the set of PRACH repetitions, and the UE may transmit each PRACH repetition of the set of PRACH repetitions using the set of ROs with mapped preambles.

Particular aspects of the subject matter described in this disclosure can be implemented to realize one or more of the following potential advantages. In some examples, by grouping ROs into RO bundles and mapping them to SSBs that support multiple preamble sequences, the described techniques can be used to enable more efficient resource utilization, thereby improving overall network efficiency and user experience. In some examples, by using varying preamble sequences across the ROs for PRACH repetitions, the described techniques can be used to generate different interference patterns across the PRACH repetitions, enhancing detection probability and reducing the chances of full collision across the PRACH repetitions.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be accessed by a computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (cNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHZ (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHZ). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHZ), FR4 (71 GHz-114.25 GHZ), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include the PRACH repetition component 198. The PRACH repetition component 198 may be configured to receive, from a network entity, an RO configuration for an RO bundle including a first number of ROs over a time range, where each RO of the first number of ROs occupies a first frequency range; and transmit, using the RO bundle, a set of PRACH repetitions including one or more preambles. The number of repetitions in the set of PRACH repetitions is less than or equal to the first number of ROs in the RO bundle, and each PRACH transmission uses one RO of the first number of ROs. In certain aspects, the base station 102 may include the PRACH repetition component 199. The PRACH repetition component 199 may be configured to transmit, for a UE, an RO configuration for an RO bundle including a first number of ROs over a time range, where each RO of the first number of ROs occupies a first frequency range; and receive a set of PRACH repetitions including one or more preambles on the first number of ROs. The number of repetitions in the set of PRACH repetitions is less than or equal to the first number of ROs in the RO bundle, and each PRACH transmission uses one RO of the first number of ROs. Although the following description may be focused on 5G NR, the concepts described herein may be applicable to other similar areas, such as LTE, LTE-A, CDMA, GSM, and other wireless technologies.

Figures 2A, 2B, 2C, 2D:
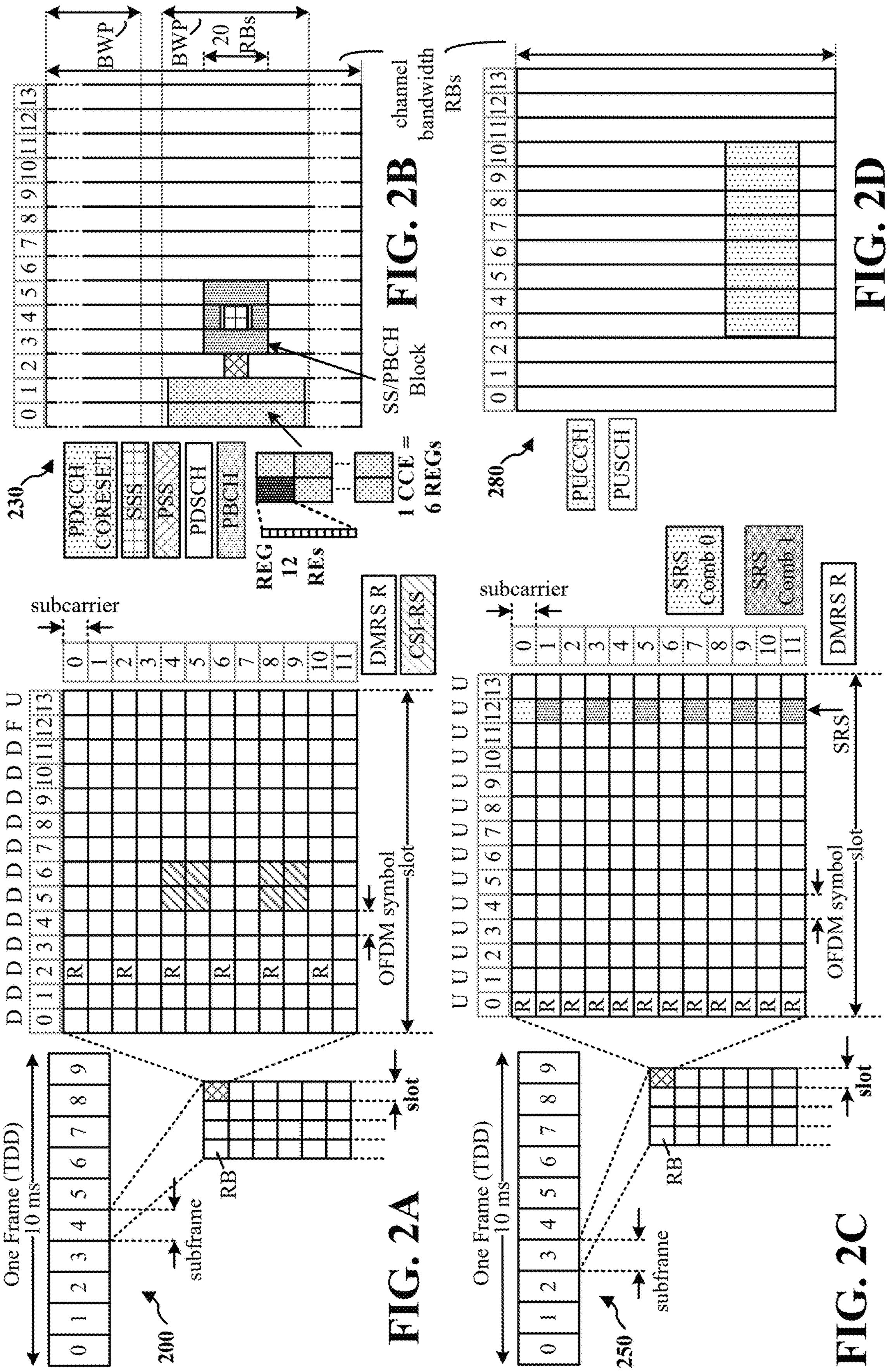
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
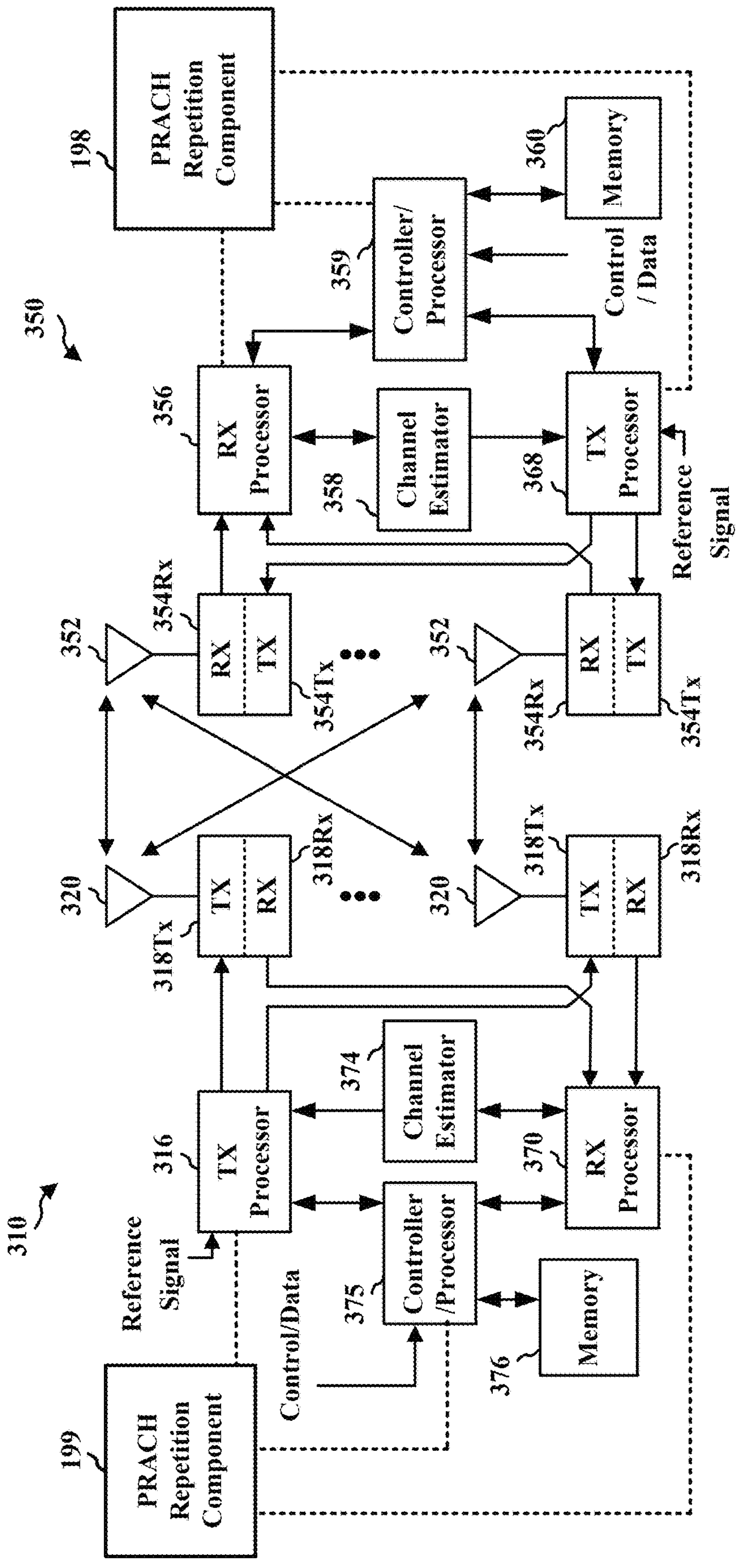
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the PRACH repetition component 198 of FIG. 1.

At least one of the TX processor 316, the RX processor 370, and the controller/processor 375 may be configured to perform aspects in connection with the PRACH repetition component 199 of FIG. 1.

Example aspects presented herein provide RO designs for PRACH repetitions, including the allocation of SSBs and RACH preambles to ROs. The existing RO design, which employs a frequency-domain first mapping of SSBs to the ROs, is not optimized for PRACH repetitions. The RO designs presented herein provide a time-domain first mapping approach. Example aspects further include methods for assigning RACH preambles to ROs associated with the time-domain first mapping.

Figure 15A:
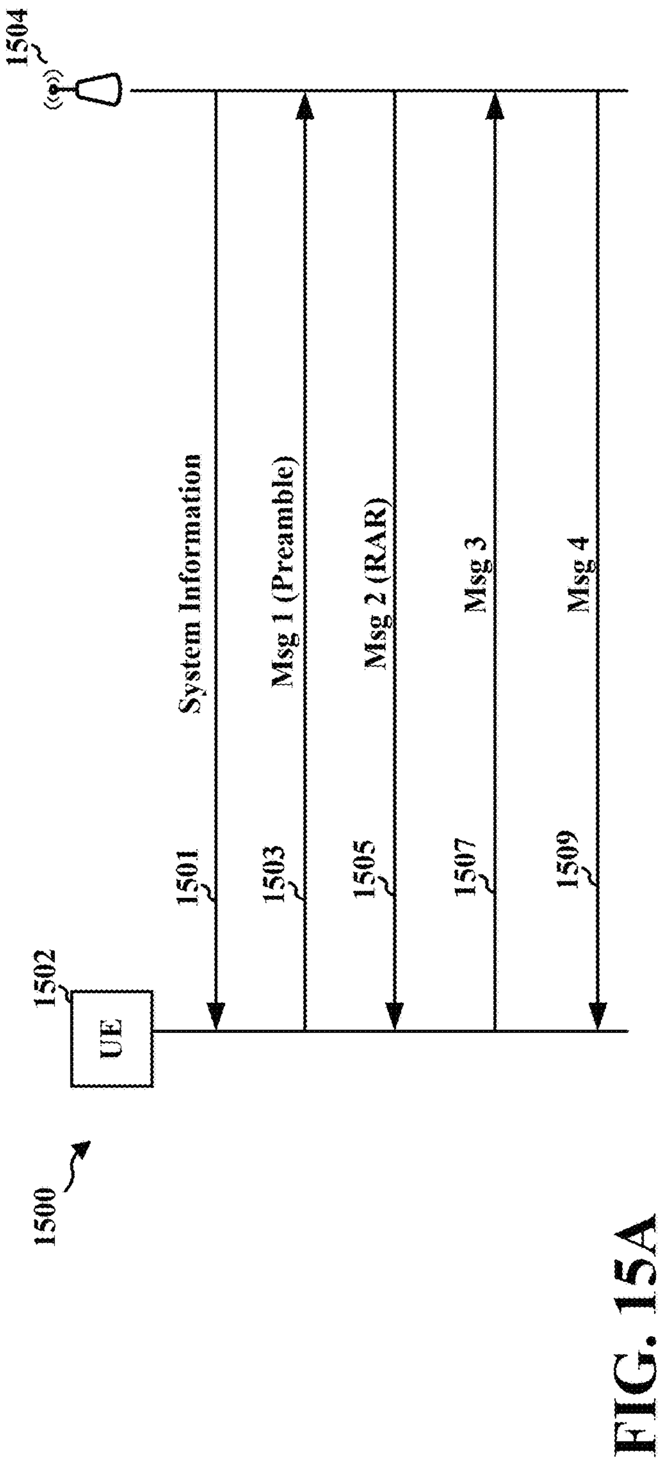
FIG. 15A and FIG. 15B illustrate example aspects of random access procedures.

A UE may use a random access procedure in order to communicate with a base station. For example, the UE may use the random access procedure to request an RRC connection, to re-establish an RRC connection, resume an RRC connection, etc. FIG. 15A illustrates example aspects of a random access procedure 1500 between a UE 1502 and a base station 1504. The UE 1502 may initiate the random access message exchange by sending, to the base station 1504, a first random access message 1503 (e.g., Msg 1) including a preamble. Prior to sending the first random access message 1503, the UE may obtain random access parameters, e.g., including preamble format parameters, time and frequency resources, parameters for determining root sequences and/or cyclic shifts for a random access preamble, etc., e.g., in system information 1501 from the base station 1504. The preamble may be transmitted with an identifier, such as a Random Access RNTI (RA-RNTI). The UE 1502 may randomly select a random access preamble sequence, e.g., from a set of preamble sequences. If the UE 1502 randomly selects the preamble sequence, the base station 1504 may receive another preamble from a different UE at the same time. In some examples, a preamble sequence may be assigned to the UE 1502.

The base station responds to the first random access message 1503 by sending a second random access message 1505 (e.g., Msg 2) using PDSCH and including a random access response (RAR). The RAR may include, e.g., an identifier of the random access preamble sent by the UE, a time advance (TA), an uplink grant for the UE to transmit data, cell radio network temporary identifier (C-RNTI) or other identifier, and/or a back-off indicator. Upon receiving the RAR at 1505, the UE 1502 may transmit a third random access message 1507 (e.g., Msg 3) to the base station 1504, e.g., using PUSCH, that may include a RRC connection request, an RRC connection re-establishment request, or an RRC connection resume request, depending on the trigger for the initiating the random access procedure. The base station 1504 may then complete the random access procedure by sending a fourth random access message 1509 (e.g., Msg 15) to the UE 1502, e.g., using PDCCH for scheduling and PDSCH for the message. The fourth random access message 1509 may include a random access response message that includes timing advancement information, contention resolution information, and/or RRC connection setup information. The UE 1502 may monitor for PDCCH, e.g., with the C-RNTI. If the PDCCH is successfully decoded, the UE 1502 may also decode PDSCH. The UE 1502 may send HARQ feedback for any data carried in the fourth random access message. If two UEs sent a same preamble at 703, both UEs may receive the RAR leading both UEs to send a third random access message 1507. The base station 1504 may resolve such a collision by being able to decode the third random access message from only one of the UEs and responding with a fourth random access message to that UE. The other UE, which did not receive the fourth random access message 1509, may determine that random access did not succeed and may re-attempt random access. Thus, the fourth message may be referred to as a contention resolution message. The fourth random access message 1509 may complete the random access procedure. Thus, the UE 1502 may then transmit uplink communication and/or receive downlink communication with the base station 1504 based on the RAR.

Figure 15B:
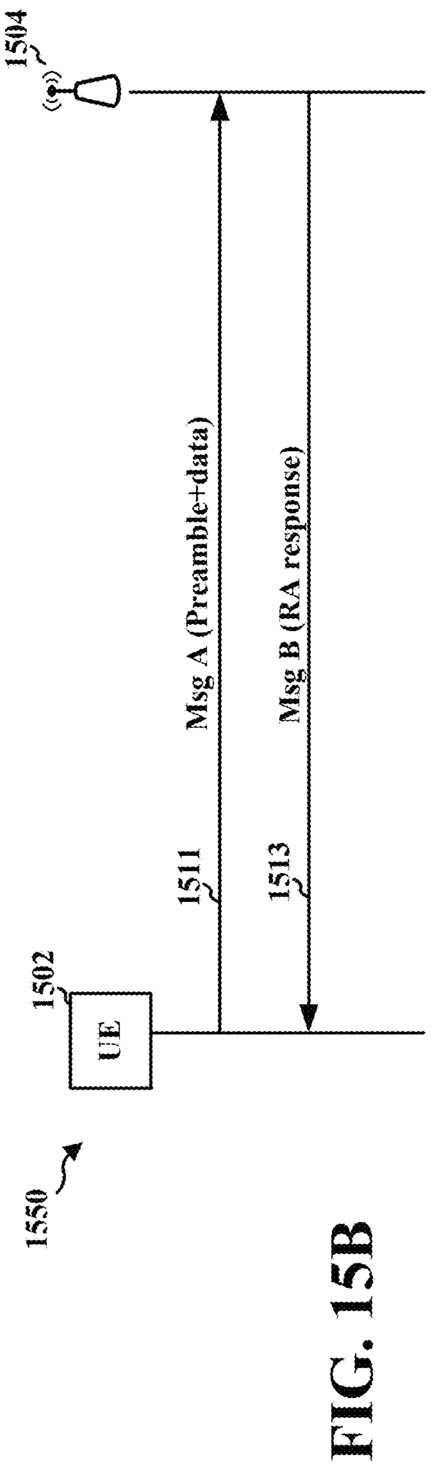

In order to reduce latency or control signaling overhead, a single round trip cycle between the UE and the base station 1504 may be achieved in a 2-step RACH process 1550, such as shown in FIG. 15B. Aspects of Msg 1 and Msg 3 may be combined in a single message, e.g., which may be referred to as Msg A. The Msg A may include a random access preamble, and may also include a PUSCH transmission, e.g., such as data. The MsgA preambles may be separate from the four step preambles, yet may be transmitted in the same random access occasions (ROs) as the preambles of the four step RACH procedure or may be transmitted in separate ROs. The PUSCH transmissions may be transmitted in PUSCH occasions (POs) that may span multiple symbols and PRBs. After the UE 1502 transmits the Msg A 1511, the UE 1502 may wait for a response from the base station 1504. Additionally, aspects of the Msg 2 and Msg 15 may be combined into a single message, which may be referred to as Msg B. Two step RACH may be triggered for reasons similar to a four-step RACH procedure. If the UE does not receive a response, the UE may retransmit the MsgA or may fall back to a four-step RACH procedure starting with a Msg 1. If the base station detects the Msg A, but fails to successfully decode the Msg A PUSCH, the base station may respond with an allocation of resources for an uplink retransmission of the PUSCH. The UE may fallback to the four step RACH with a transmission of Msg 3 based on the response from the base station and may retransmit the PUSCH from Msg A. If the base station successfully decodes the Msg A and corresponding PUSCH, the base station may reply with an indication of the successful receipt, e.g., as a random access response 1513 that completes the two-step RACH procedure. The Msg B may include the random access response and a contention-resolution message. The contention resolution message may be sent after the base station successfully decodes the PUSCH transmission.

In wireless communication, user equipment (UE) may initiate communication with a network (e.g., a base station) by sending a preamble message on a physical random access channel (PRACH). In situations where the network conditions are challenging, such as when the signal strength is low or the interference is high, the UE may repeat the transmission of the preamble message multiple times, a process referred to as "PRACH repetition," to enhance the reliability of the PRACH access attempts. In a PRACH repetition transmission, the UE may locate, or identify, ROs associated with the same synchronization signal block (SSB), the ROs being adjacent in time and at the same frequency. The UE then uses those ROs for a number of repetitions. In some aspects, the number of repetitions may be specified.

There may be a mapping between the ROs and/or preambles and the SSBs transmitted by the base station. In some examples, the network may allocate the ROs to the SSBs based on a round-robin process. As used herein, the "round-robin process" may refer to a process where the participants of the process (e.g., the to-be-allocated of ROs) are dealt with one at a time in a cyclic order. For example, in a round-robin process, the preambles may be sequentially ordered in the cyclic shift domain, then the root domain, followed by the frequency domain, and finally, the time RO domain. For PRACH repetition transmissions, the UE may locate the ROs associated with the same SSB that are adjacent in the time domain and located at the same frequency range. These ROs may be used to form a desired number of repetitions, and the target repetition may be configurable via radio resource control (RRC) configurations. However, the round-robin process to allocate ROs to SSBs may not optimize the resource usage for the PRACH repetitions. Example aspects presented herein provide a mapping strategy for ROs to SSBs that may significantly improve support for flexible PRACH repetition.

Figure 4:
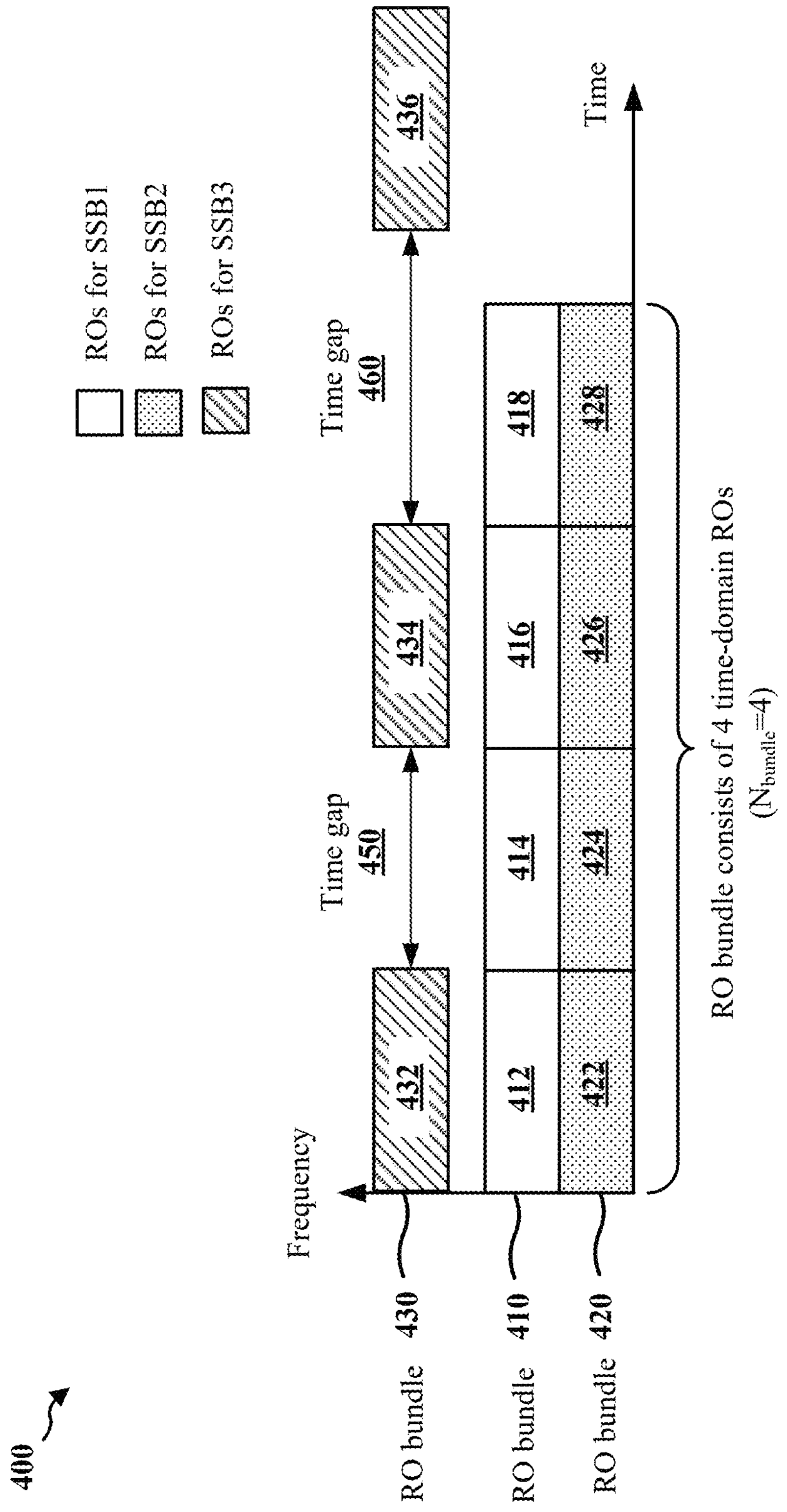
FIG. 4 is a diagram illustrating example random access occasion (RO) bundles in accordance with various aspects of the present disclosure.

In some aspects, the maximum number of PRACH repetitions supported is $N_{bundle}$. Then, the ROs for the PRACH repetitions may be the grouped into RO bundles, with each RO bundle including $N_{bundle}$ ROs over a time range. The $N_{bundle}$ ROs may occupy the same frequency range. FIG. 4 is a diagram 400 illustrating example RO bundles in accordance with various aspects of the present disclosure. In FIG. 4, the RO bundle (e.g., RO bundle 410, 420) may include four ROs (e.g., RO 412, 414, 416, 418 in RO bundle 410; and RO 422, 424, 426, 428 in RO bundle 420). In some aspects, the $N_{bundle}$ ROs in an RO bundle may be adjacent to each other over the time range. For example, RO 412 and RO 414 may be adjacent to each other over the time range. In some aspects, a time gap may be provided between ROs in the $N_{bundle}$ ROs in an RO bundle. RO bundle 430 shows an example of a time gap 450 between ROs 432 and 434 and a time gap 460 between ROs 434 and 436 within the bundle. For example, the time gap may between two ROs in an RO bundle (e.g., time gap 450) may be one or more samples, one or more symbols, or one or more slots. In some examples, the $N_{bundle}$ ROs in an RO bundle may correspond to the same SSB. For example, RO 412, 414, 416, 418 in RO bundle 410 may correspond to a first SSB (e.g., SSB1), and RO 422, 424, 426, 418 in RO bundle 410 may correspond to a second SSB (e.g., SSB2).

In some aspects, the mapping of ROs to SSBs may be performed with respect to the RO bundle (e.g., RO bundle 410, 420), instead of individual ROs, and each RO bundle may support multiple preamble sequences. The number of preambles in each RO bundle may be determined based on the split of resources in the RO bundle, with each time domain RO in an RO bundle (e.g., RO 412, 414, 416, 418 in RO bundle 410) may contain a number, M, of PRACH preamble sequences (in the root and CS domains).

In some aspects, for PRACH repetition transmissions, users may, via UE or the base station, select a number of repetitions, Nrep. The number of repetitions (e.g., Nrep) may be less than or equal to the maximum number of supported repetitions (e.g., $N_{bundle}$). For an RO bundle, Nrep out of the $N_{bundle}$ time domain ROs in the RO bundle may be used for the PRACH repetition transmissions. As an example, the repetition number (e.g., Nrep) may be selected based on the network conditions, such as the downlink path loss measurements. For example, UEs that are closer to the cell center (which may have a better network condition than those at the cell edge) might select a smaller number of repetitions, while UEs at the cell edge may choose a higher number of repetitions to ensure more reliable communication.

In some aspects, the selection of preamble sequences (i.e., a sequence including one or more preambles on the one or more ROs in an RO bundle) and the time domain ROs for PRACH repetition transmissions may be based on the signaling from the network (e.g., a base station or gNB). Several different designs may be employed for the selection of preambles and ROs for the PRACH repetition transmissions.

In some aspects, the network (e.g., a base station or gNB) may communicate to UE the number of preambles allocated for each PRACH repetition. The preamble sequence allocated for a PRACH repetition may remain the same across all the ROs. In some examples, based on the available preambles, UE may assign the ROs and the sequences to be assigned for each repetition in a round-robin process, for example.

Figure 5:
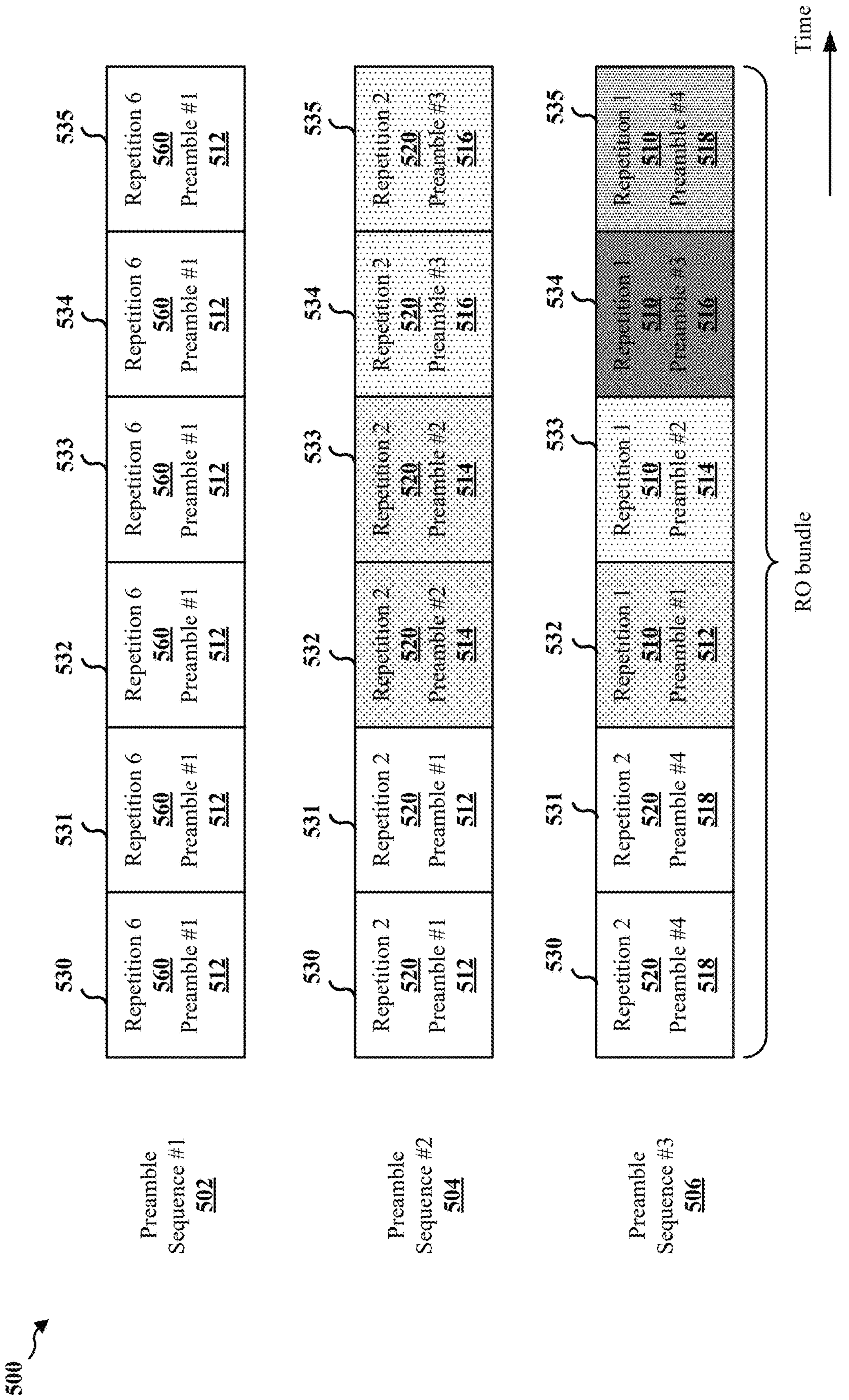
FIG. 5 is a diagram illustrating an example of RO allocation for physical random access channel (PRACH) repetitions in accordance with various aspects of the present disclosure.

In some aspects, the round-robin allocation may start in the order of ROs and then on the preamble sequence. FIG. 5 is a diagram 500 illustrating an example of RO allocation for PRACH repetitions in accordance with various aspects of the present disclosure. In the example in FIG. 5, the maximum number of supported repetitions is set to six (i.e., $N_{bundle}=6$), and each RO in the RO bundle may contain three PRACH preamble sequences (i.e., M=3). As an example, for one repetition (e.g., repetition 1 510), UE may assign up to $N_{bundle}$ (e.g., 6) preambles (e.g., preamble #1 512, preamble #2 514, preamble #3 516, preamble #4 518) across ROs (e.g., RO 530, 531, 532, 533, 534, 535) for one preamble sequence (e.g., preamble sequence #3 506). As the number of repetitions increases, the assigned preambles across ROs may decrease proportionally. For example, for two repetitions (e.g., repetition 2 520), UE may assign up to $N_{bundle}/2$ (e.g., 3) of preambles (e.g., preamble #1 512, preamble #2 514, preamble #3 516) across ROs for one preamble sequence (e.g., preamble sequence #2 504). For $N_{bundle}$ (e.g., 6) repetitions (e.g., repetition 6 560), UE may assign one preamble (e.g., preamble #1 512) across ROs for one preamble sequence (e.g., preamble sequence #1 502). For each repetition, UE may assign all possible ROs for a preamble sequence before moving on to the next preamble sequence.

The allocation process also incorporates flexibility to adapt to the available resources. For example, during the round-robin process, if the number of ROs left for a preamble sequence is less than the current repetition number, those ROs for that preamble sequence may be left unassigned or allocated to a lower repetition. In the example of FIG. 5, the base station (e.g., a gNB) may assign different numbers of preambles for various repetitions. For example, the base station (e.g., gNB) may assign four preambles (e.g., preamble #1 512, preamble #2 514, preamble #3 516, preamble #4 518) for one repetition (e.g., repetition 1 510), four preambles (e.g., preamble #1 512, preamble #2 514, preamble #3 516, preamble #4 518) for two repetitions (e.g., repetition 2 520), and one preamble (e.g., preamble #1 512) for six repetitions (e.g., repetition 6 560). As shown in FIG. 5, based on the assigned preambles for each repetition, the first preamble sequence (e.g., sequence #1 502) may include six preamble #1 512 respectively associated with six ROs (e.g., RO 530, 531, 532, 533, 534, 535) in an RO bundle. The second preamble sequence (e.g., preamble sequence #2 504) may include three preambles (e.g., preamble #1 512, preamble #2 514, preamble #3 516), with each preamble associated with two ROs (e.g., preamble #1 512 is associated with RO 530, 531) in the RO bundle. The third preamble sequence (e.g., preamble sequence #3 506) may include four preamble sequences (e.g., preamble #1 512, preamble #2 514, preamble #3 516, and preamble #4 518). The preamble for the two repetitions (e.g., preamble #4 518) is associated with RO 530 and 531 for repetition 2 520. Each of these four preambles (e.g., preamble #1 512, preamble #2 514, preamble #3 516, and preamble #4 518) may further be respectively associated with the remaining RO (e.g., RO 532, 533, 534, 535) in the RO bundle.

Figure 6:
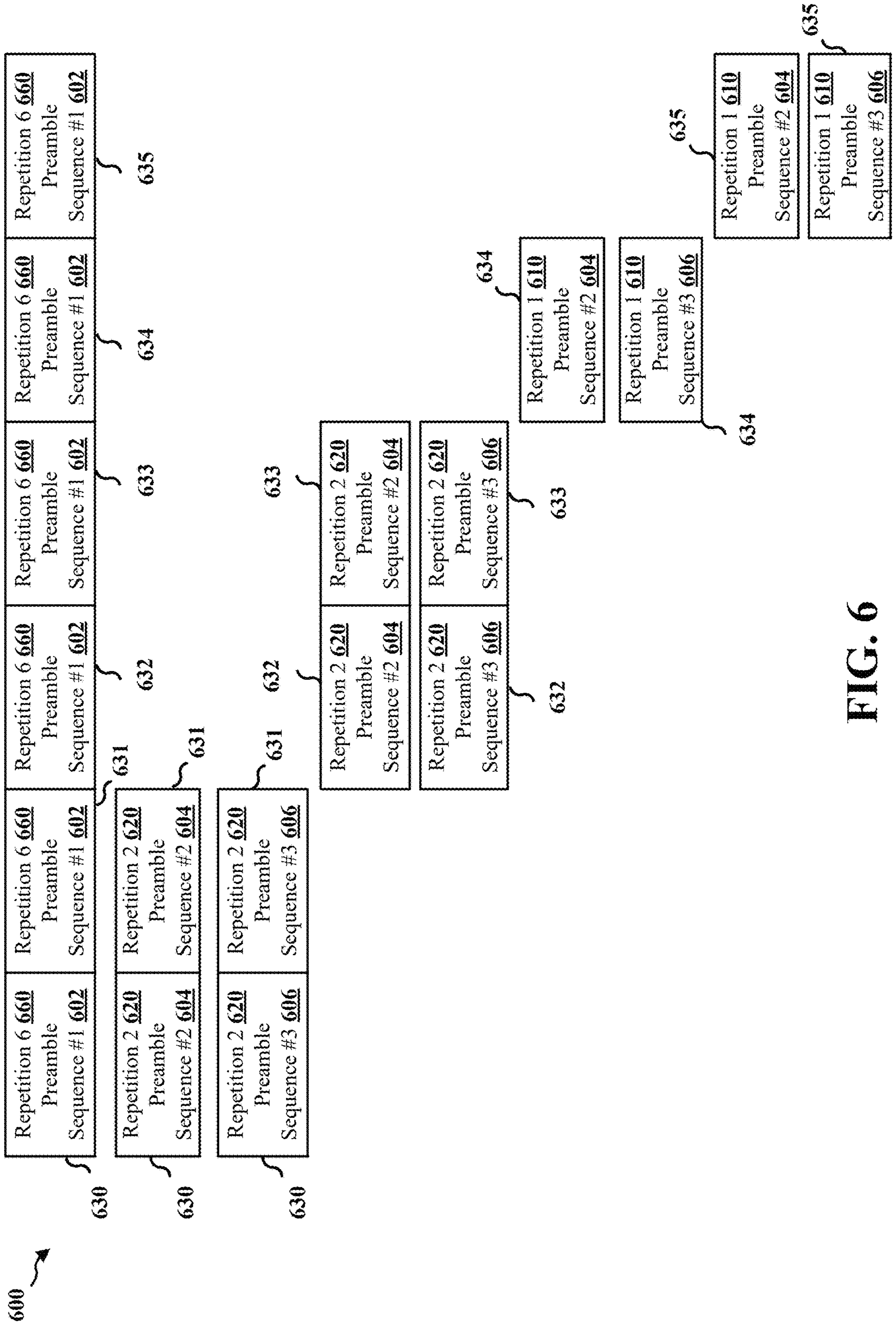
FIG. 6 is a diagram illustrating an example of RO allocation for PRACH repetitions in accordance with various aspects of the present disclosure.

In some aspects, the round-robin allocation may start in the order of preamble sequences and then on the ROs. In this allocation strategy, for each repetition, UE may assign all possible preamble sequences to a set of ROs first before moving on to the next set of ROs. The number of ROs in the set of ROs may be equal to the number of repetitions. FIG. 6 is a diagram 600 illustrating an example of RO allocation for PRACH repetitions in accordance with various aspects of the present disclosure. In the example in FIG. 6, the maximum number of supported repetitions is set to six (e.g., $N_{bundle}=6$), and each RO in the RO bundle may contain three PRACH preamble sequences (e.g., M=3). The base station (e.g., a gNB) may assign different numbers of preambles for various repetitions. For example, the base station (e.g., gNB) may assign four preambles for one repetition (e.g., repetition 1 610), four preambles for two repetitions (e.g., repetition 2 620), and one preamble for six repetitions (e.g., repetition 6 660). As shown in FIG. 6, for six repetitions (e.g., repetition 6 660), the UE may first assign preamble sequence #1 602 for a set of six ROs, including RO 630, 631, 632, 633, 634, 635. For two repetitions (e.g., repetition 2 620), the UE may first assign all possible preamble sequences (e.g., preamble sequence #2 604, preamble sequence #3 606) to a set of two ROs, including RO 630, 631, before moving on to assign the possible preamble sequences (e.g., preamble sequence #2 604, preamble sequence #3 606) to another set of two ROs, including RO 632, 633. Similarly, for one repetition (e.g., repetition 1 610), the UE may first assign all possible preamble sequences (e.g., preamble sequence #2 604, preamble sequence #3 606) to one RO 634, before moving on to assign the possible preamble sequences (e.g., preamble sequence #2 604, preamble sequence #3 606) to another RO 635.

In some aspects, a base station (e.g., a gNB) may communicate to UE the specific preamble sequences and ROs used for each repetition. For example, referring to FIG. 5, the base station (e.g., a gNB) may communicate to UE preamble sequence #1 502 and ROs (e.g., RO 530, 531, 532, 533, 534, 535) used for repetition 6 560. In some examples, each preamble sequence may be reserved for a certain repetition for a special case. For example, referring to FIG. 5, preamble sequence #1 502 may be reserved for repetition 6 560.

In some aspects, a base station (e.g., a gNB) may assign different preamble sequences across the time domain ROs for a repetition. For example, referring to FIG. 5, in some examples, the base station (e.g., a gNB) may assign preamble sequence #1 502 (which includes six preamble #1 512) across the time domain ROs for repetition 6 560. In some examples, the base station (e.g., a gNB) may assign a different preamble sequence (e.g., a sequence includes six preamble #2 514) across the time domain ROs for repetition 6 560. These different preamble sequences across repetitions may lead to different interference patterns across repetitions, particularly beneficial when transmissions from adjacent cells are considered. For example, by employing different preamble sequence patterns across repetitions for adjacent cells, the probability of successful detection may be improved as the risk of full collision across repetitions is reduced or avoided.

In some aspects, for a repetition, the preamble sequence assigned across the ROs may vary in a linear order. For example, the linear order may include a linear ascending order or a linear descending order with respect to sequence indices of the preamble sequence. For example, in a scenario with four repetitions, the preamble sequences assigned may be {1, 3, 5, 7} across four ROs, incrementing by two for each subsequent RO, where the number 1, 3, 5, or 7 represent the sequence indices (or other identifiers) of the preamble sequences. As used herein, an RO is assigned a preamble sequence means the RO is assigned a preamble in the preamble sequence whose position corresponds to the position of the RO in the RO bundle. For example, the preamble sequence 1 is assigned to the first RO of the four ROs means the first RO was assigned the preamble in preamble sequence 1 whose position corresponds to the first RO in the RO bundle (e.g., the first preamble in preamble sequence 1). The preamble sequence 3 is assigned to the second RO of the four ROs means the second RO was assigned the preamble in preamble sequence 3 whose position corresponds to the second RO in the RO bundle (e.g., the second preamble in preamble sequence 3). This linear order may be adjusted across adjacent cells, thereby creating a varying interference patterns across ROs to improve the probability of successful detection.

Figure 7:
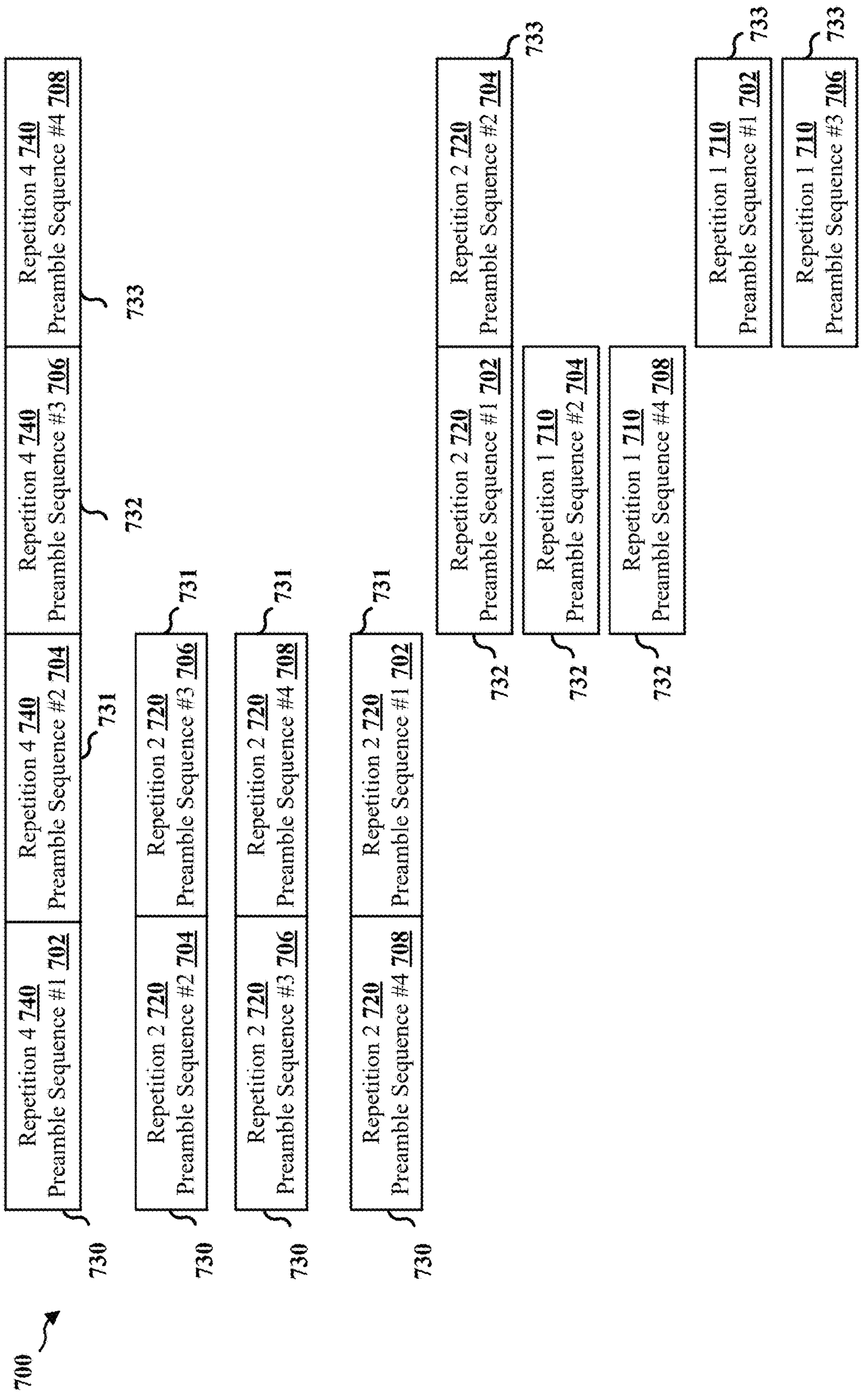
FIG. 7 is a diagram illustrating an example of RO allocation for PRACH repetitions in accordance with various aspects of the present disclosure.

In some examples, a base station (e.g., a gNB) may signal to users the number of preambles for repetition and the linear order for the transmission of these preambles. For example, the users may assign all possible preamble sequences (e.g., preamble sequences following a linear ascending order or a linear descending order with respect to preamble indices) to a set of ROs first before moving on to the next set of ROs. FIG. 7 is a diagram 700 illustrating an example of RO allocation for PRACH repetitions in accordance with various aspects of the present disclosure. In the example in FIG. 7, the maximum number of supported repetitions is set to four (e.g., $N_{bundle}$=4), and each RO in the RO bundle may contain four PRACH preamble sequences (e.g., M=4). The base station (e.g., a gNB) may assign different numbers of preambles for various repetitions. For example, the base station (e.g., gNB) may assign four preambles for one repetition (e.g., repetition 1 710), four preambles for two repetitions (e.g., repetition 2 720), and one preamble for four repetitions (e.g., repetition 4 740). The base station (e.g., a gNB) may further indicate the linear order across the ROs to be 1 (e.g., the adjacent ROs will be assigned preamble sequences whose indices varied by 1). As shown in FIG. 7, for four repetitions (e.g., repetition 4 740), the UE may first assign preamble sequences varying by a linear order of 1 to a set of four ROs, including RO 730, 731, 732, 733. That is, the UE may assign preamble sequence #1 702 to RO 730, preamble sequence #2 704 to RO 731, preamble sequence #3 706 to RO 732, and preamble sequence #4 706 to RO 733. For two repetitions (e.g., repetition 2 720), the UE may first assign preamble sequences varying by a linear order of 1 to a set of two ROs (e.g., RO 730, 731). That is, the UE may assign preamble sequence #2 704 to RO 730, preamble sequence #3 706 to RO 731. Then, the UE may further assign preamble sequence #3 706 to RO 730, and preamble sequence #4 708 to RO 731. The UE may further assign preamble sequence #4 708 to RO 730, and preamble sequence #1 702 to RO 731. The UE may further assign preamble sequence #1 702 to RO 732, and preamble sequence #2 704 to RO 733. For one repetition (e.g., repetition 1 710), the UE may further assign preamble sequence #2 704 to RO 732, preamble sequence #4 708 to RO 732, preamble sequence #1 702 to RO 733, and preamble sequence #3 706 to RO 733, respectively.

In some aspects, the preamble sequence may be a fixed pattern across ROs for a repetition. The fixed sequence pattern may vary across adjacent cells. In some examples, a base station (e.g., a gNB) may signal the number of preambles for a repetition and the fixed pattern to be employed for each repetition. For example, the UE may use the preamble sequence with the fixed pattern signaled from the base station (e.g., a gNB) for each repetition. In scenarios that involve adjacent cells, different base stations may also configure different linear orders for the preambles to distribute the interference.

Figure 8:
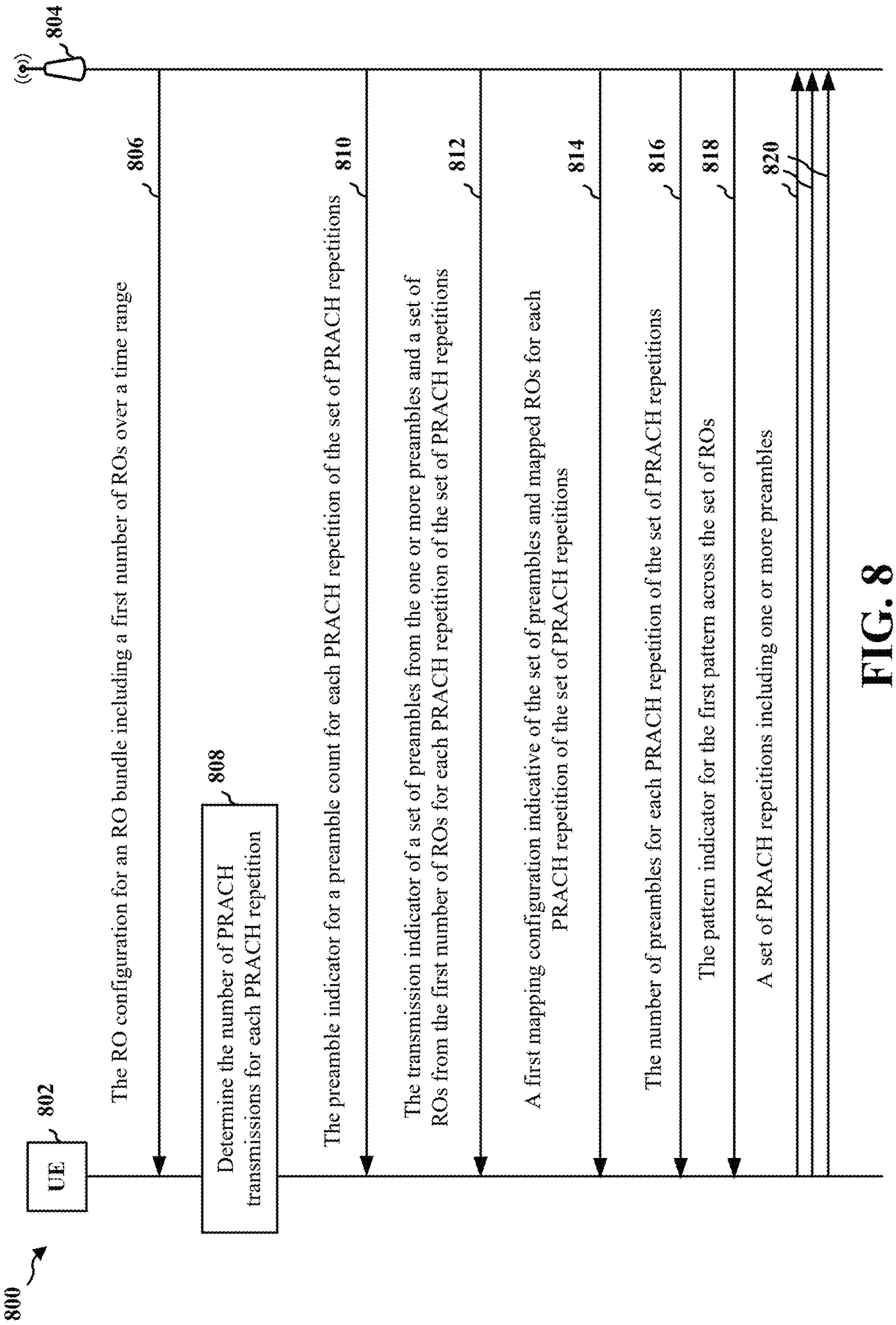
FIG. 8 is a call flow diagram illustrating a method of wireless communication in accordance with various aspects of the present disclosure.

FIG. 8 is a call flow diagram 800 illustrating a method of wireless communication in accordance with various aspects of this present disclosure. Various aspects are described in connection with a UE 802 and a base station 804. The aspects may be performed by the UE 802 or the base station 804 in aggregation and/or by one or more components of a base station 804 (e.g., a CU 110, a DU 130, and/or an RU 140).

As shown in FIG. 8, at 806, a UE 802 may receive, from base station 804, an RO configuration for an RO bundle. The RO bundle may include a first number of ROs over a time range, and each RO of the first number of ROs may occupy a first frequency range. For example, referring to FIG. 4, the RO bundle 410 may include four ROs (e.g., RO 412, 414, 416, 418), and these ROs (e.g., RO 412, 414, 416, 418) may occupy the same frequency range.

At 808, the UE 802 may determine the number of PRACH transmissions for each PRACH repetition. For example, the UE may select the number of repetitions, Nrep, which may be less than or equal to the maximum number of supported repetitions (e.g., $N_{bundle}$). In some examples, the UE may determine the number of PRACH transmissions based on network conditions (e.g., the downlink pathloss measurement).

At 810, the UE 802 may receive, from base station 804, a preamble indicator for a preamble count for each PRACH repetition of the set of PRACH repetitions. For example, referring to FIG. 5, the preamble indicator may indicate that the preamble count for repetition 6 560 is one, the preamble count for repetition 2 520 is four, and the preamble count for repetition 1 510 is four.

At 812, the UE 802 may receive, from base station 804, a transmission indicator of a set of preambles from the one or more preambles and a set of ROs from the first number of ROs for each PRACH repetition of the set of PRACH repetitions. The set of preambles may map to the set of ROs for each PRACH repetition of the set of PRACH repetitions. For example, referring to FIG. 6, the transmission indicator may indicate a set of preambles (e.g., preamble #2 604, preamble #3 606) from the one or more preambles and a set of ROs (e.g., RO 630, 631) from the first number of ROs for each PRACH repetition (e.g., repetition 2 620) of the set of PRACH repetitions.

At 814, the UE 802 may receive, from base station 804, a first mapping configuration indicative of the set of preambles and mapped ROs for each PRACH repetition of the set of PRACH repetitions. For example, referring to FIG. 5, the first mapping configuration may indicate the set of preambles (e.g., preamble #1 512) and mapped ROs (e.g., RO 530, 531, 532, 533, 534, 535).

At 816, the UE 802 may receive, from base station 804, the number of preambles for each PRACH repetition of the set of PRACH repetitions. For example, referring to FIG. 7, the UE may receive the number of preambles (e.g., four preambles) for each PRACH repetition (e.g., repetition 4 740) of the set of PRACH repetitions.

At 818, the UE 802 may receive, from base station 804, a pattern indicator for the first pattern across the set of ROs. For example, referring to FIG. 7, the pattern indicator may indicate that, for repetition 4 740, the pattern across the set of ROs may include preamble #1 702, preamble #2 704, preamble #3 706, and preamble #4 708 for RO 730, RO 731, RO 732, RO 733, respectively.

At 820, the UE 802 may transmit, using the RO bundle, a set of PRACH repetitions including one or more preambles. Although an example of three repetitions is shown to illustrate the concept, the concepts presented herein may be used for any number of two or more transmissions. The number of repetitions in the set of PRACH repetitions is less than or equal to the first number of ROs in the RO bundle, and each PRACH transmission uses one RO of the first number of ROs. For example, referring to FIG. 5, the UE may transmit a set of PRACH repetitions (e.g., repetition 2 520) including one or more preambles (e.g., preamble #1 512, preamble #2 514, preamble #3 516, and preamble #4 518). The number of repetitions in the set of PRACH repetitions (e.g., 2 in repetition 2 520) is less than or equal to the first number of ROs (e.g., six) in the RO bundle.

Figure 9:
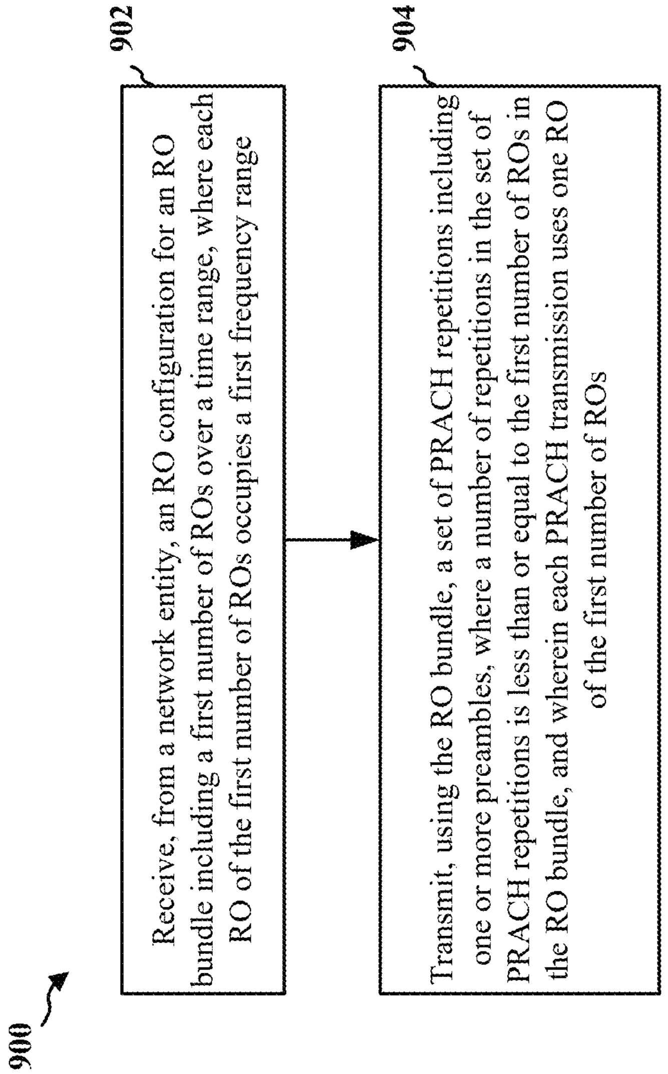
FIG. 9 is a flowchart illustrating methods of wireless communication at a UE in accordance with various aspects of the present disclosure.

FIG. 9 is a flowchart 900 illustrating methods of wireless communication at a UE in accordance with various aspects of the present disclosure. The method may be performed by a UE. The UE may be the UE 104, 350, 802, or the apparatus 1304 in the hardware implementation of FIG. 13. By grouping ROs into RO bundles and mapping them to SSBs that support multiple preamble sequences, the methods enable more efficient resource utilization, thereby improving overall network efficiency and user experience. Additionally, by using varying preamble sequences across the ROs for PRACH repetitions, the methods generate different interference patterns across the PRACH repetitions, enhancing detection probability and reducing the chances of full collision across the PRACH repetitions.

As shown in FIG. 9, at 902, the UE may receive, from a network entity, an RO configuration for an RO bundle including a first number of ROs over a time range. Each RO of the first number of ROs may occupy a first frequency range. The network entity may be a base station, or a component of a base station, in the access network of FIG. 1 or a core network component (e.g., base station 102, 310, 804; or the network entity 1302 in the hardware implementation of FIG. 13). FIG. 4, FIG. 5, FIG. 6, FIG. 7, and FIG. 8 illustrate various aspects of the steps in connection with flowchart 900. For example, referring to FIG. 8, at 806, the UE 802 may receive, from a network entity (base station 804), an RO configuration for an RO bundle including a first number of ROs over a time range. For example, referring to FIG. 4, the RO bundle 410 may include four ROs (e.g., RO 412, 414, 416, 418), and these ROs (e.g., RO 412, 414, 416, 418) may occupy the same frequency range. In some aspects, 902 may be performed by the PRACH repetition component 198.

At 904, the UE may transmit, using the RO bundle, a set of PRACH repetitions including one or more preambles. The number of repetitions in the set of PRACH repetitions may be less than or equal to the first number of ROs in the RO bundle, and each PRACH transmission may use one RO of the first number of ROs. For example, referring to FIG. 8, the UE 802 may transmit, at 820, using the RO bundle, a set of PRACH repetitions including one or more preambles. For example, referring to FIG. 5, the UE may transmit a set of PRACH repetitions (e.g., repetition 2 520) including one or more preambles (e.g., preamble #1 512, preamble #2 514, preamble #3 516, and preamble #4 518). The number of repetitions in the set of PRACH repetitions (e.g., 2 in repetition 2 520) is less than or equal to the first number of ROs (e.g., six) in the RO bundle. In some aspects, 904 may be performed by the PRACH repetition component 198.

Figure 10:
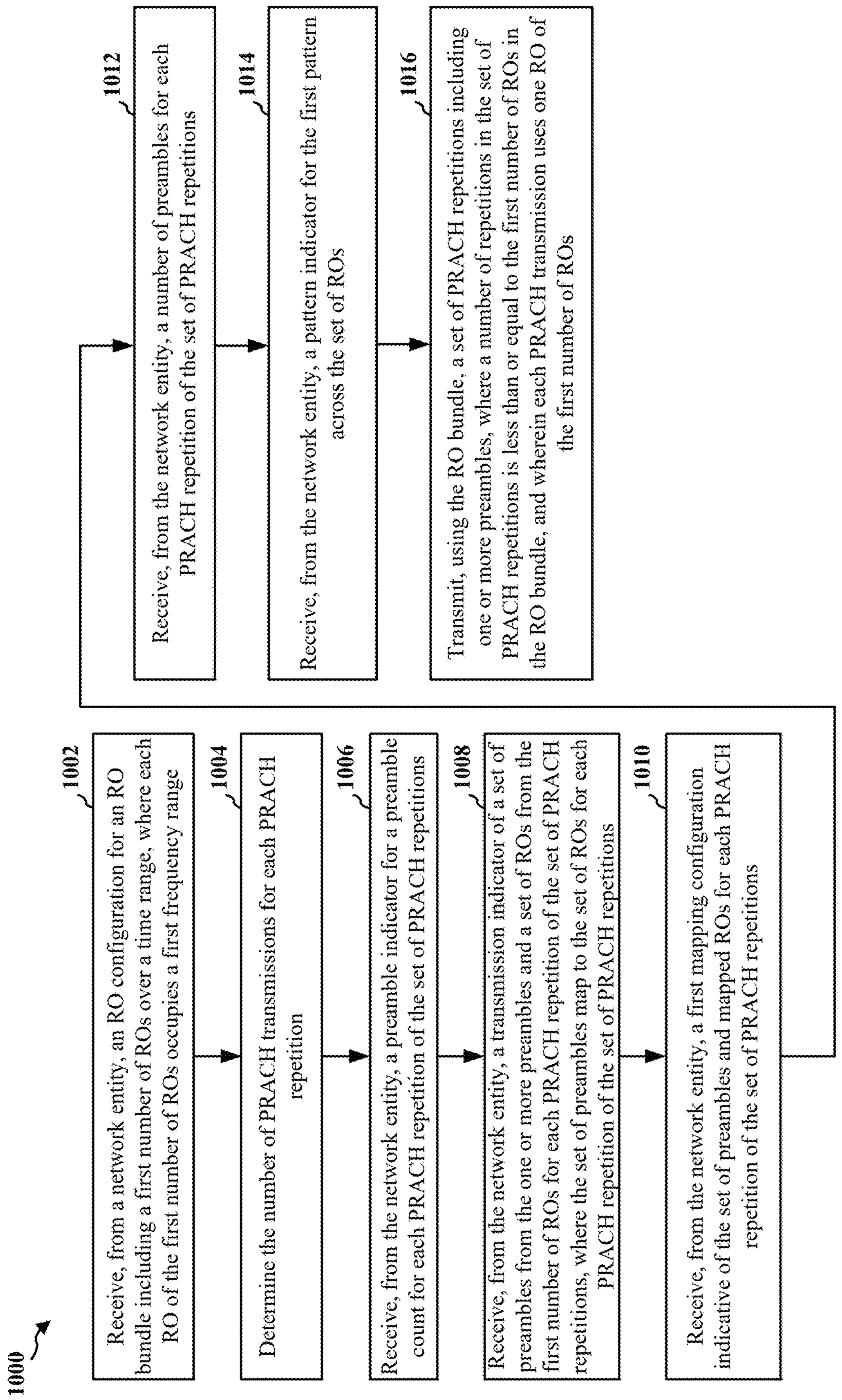
FIG. 10 is a flowchart illustrating methods of wireless communication at a UE in accordance with various aspects of the present disclosure.

FIG. 10 is a flowchart 1000 illustrating methods of wireless communication at a UE in accordance with various aspects of the present disclosure. The method may be performed by a UE. The UE may be the UE 104, 350, 802, or the apparatus 1304 in the hardware implementation of FIG. 13. By grouping ROs into RO bundles and mapping them to SSBs that support multiple preamble sequences, the methods enable more efficient resource utilization, thereby improving overall network efficiency and user experience. Additionally, by using varying preamble sequences across the ROs for PRACH repetitions, the methods generate different interference patterns across the PRACH repetitions, enhancing detection probability and reducing the chances of full collision across the PRACH repetitions.

As shown in FIG. 10, at 1002, the UE may receive, from a network entity, an RO configuration for an RO bundle including a first number of ROs over a time range. Each RO of the first number of ROs may occupy a first frequency range. The network entity may be a base station, or a component of a base station, in the access network of FIG. 1 or a core network component (e.g., base station 102, 310, 804; or the network entity 1302 in the hardware implementation of FIG. 13). FIG. 4, FIG. 5, FIG. 6, FIG. 7, and FIG. 8 illustrate various aspects of the steps in connection with flowchart 1000. For example, referring to FIG. 8, at 806, the UE 802 may receive, from a network entity (base station 804), an RO configuration for an RO bundle including a first number of ROs over a time range. For example, referring to FIG. 4, the RO bundle 410 may include four ROs (e.g., RO 412, 414, 416, 418), and these ROs (e.g., RO 412, 414, 416, 418) may occupy the same frequency range. In some aspects, 1002 may be performed by the PRACH repetition component 198.

At 1016, the UE may transmit, using the RO bundle, a set of PRACH repetitions including one or more preambles. The number of repetitions in the set of PRACH repetitions may be less than or equal to the first number of ROs in the RO bundle, and each PRACH transmission may use one RO of the first number of ROs. For example, referring to FIG. 8, the UE 802 may transmit, at 820, using the RO bundle, a set of PRACH repetitions including one or more preambles. For example, referring to FIG. 5, the UE may transmit a set of PRACH repetitions (e.g., repetition 2 520) including one or more preambles (e.g., preamble #1 512, preamble #2 514, preamble #3 516, and preamble #4 518). The number of repetitions in the set of PRACH repetitions (e.g., 2 in repetition 2 520) is less than or equal to the first number of ROs (e.g., six) in the RO bundle. In some aspects, 1016 may be performed by the PRACH repetition component 198.

In some aspects, each RO in the time range and the first frequency range may correspond to a single SSB. For example, referring to FIG. 4, RO 422, 424, 426, and 428 in RO bundle 420 correspond to a single SSB (e.g., SSB2).

In some aspects, the first number of ROs in the RO bundle may be adjacent over the time range. For example, referring to FIG. 4, RO 422, 424, 426, and 428 in RO bundle 420 may be adjacent over the time range.

In some aspects, a time gap may be provided between ROs in the RO bundle. For example, referring to FIG. 4, in some aspects, a time gap 450 may be provided between ROs in the RO bundle (e.g., between RO 432 and 434 in the RO bundle 430).

In some aspects, at 1004, the UE may determine the number of PRACH transmissions for each PRACH repetition. For example, referring to FIG. 8, at 808, the UE 802 may determine the number of PRACH transmissions for each PRACH repetition. For example, the UE may select the number of repetitions, Nrep, which may be less than or equal to the maximum number of supported repetitions (e.g., $N_{bundle}$). In some aspects, 1004 may be performed by the PRACH repetition component 198.

In some aspects, to determine the number of PRACH transmissions (at 1004), the UE may determine, based on a downlink pathloss measurement, the number of repetitions for the PRACH transmissions. For example, referring to FIG. 8, at 808, the UE 802 may determine, based on a downlink pathloss measurement, the number of repetitions for the PRACH transmissions.

In some aspects, at 1008, the UE may receive, from the network entity, a transmission indicator of a set of preambles from the one or more preambles and a set of ROs from the first number of ROs for each PRACH repetition of the set of PRACH repetitions. The set of preambles may map to the set of ROs for each PRACH repetition of the set of PRACH repetitions. To transmit the set of PRACH repetitions (at 1016), the UE may transmit, using the set of ROs with mapped preambles, each PRACH repetition of the set of PRACH repetitions. For example, referring to FIG. 8, at 812, the UE 802 may receive, from the network entity (base station 804), a transmission indicator of a set of preambles from the one or more preambles and a set of ROs from the first number of ROs for each PRACH repetition of the set of PRACH repetitions. For example, referring to FIG. 6, the transmission indicator may indicate a set of preambles (e.g., preamble #2 604, preamble #3 606) from the one or more preambles and a set of ROs (e.g., RO 630, 631) from the first number of ROs for each PRACH repetition (e.g., repetition 2 620) of the set of PRACH repetitions. To transmit the set of PRACH repetitions (at 820), the UE 802 may transmit, using the set of ROs (e.g., RO 630, 631) with mapped preambles (e.g., preamble #2 604, preamble #3 606), each PRACH repetition (e.g., repetition 2 620) of the set of PRACH repetitions. In some aspects, 1008 may be performed by the PRACH repetition component 198.

In some aspects, at 1006, the UE may receive, from the network entity, a preamble indicator for a preamble count for each PRACH repetition of the set of PRACH repetitions. For example, referring to FIG. 8, at 810, the UE 802 may receive, from the network entity (base station 804), a preamble indicator for a preamble count for each PRACH repetition of the set of PRACH repetitions. For example, referring to FIG. 5, the preamble indicator may indicate that the preamble count for repetition 6 560 is one, the preamble count for repetition 2 520 is four, and the preamble count for repetition 1 510 is four. In some aspects, 1006 may be performed by the PRACH repetition component 198.

In some aspects, the PRACH transmissions in each PRACH repetition of the set of PRACH repetitions may include a same preamble. For example, referring to FIG. 5, the PRACH transmissions in each PRACH repetition (e.g., repetition 6 560) of the set of PRACH repetitions may include a same preamble (e.g., preamble #1 512).

In some aspects, for each preamble of the set of preambles, all possible ROs of the set of ROs map with the preamble before mapping to a different preamble of the set of preambles to the set of ROs. For example, referring to FIG. 5, for two repetitions (e.g., repetition 2 520), all possible ROs (e.g., RO 530, 531, 532, 533, 534, 535) of the set of ROs map with the preamble (e.g., preamble #1 512, preamble #2 514, preamble #3 516) before mapping to a different preamble (e.g., preamble #4 518) of the set of preambles to the set of ROs.

In some aspects, for each RO of the set of ROs, all possible preambles of the set of preambles map with the RO before mapping a different RO of the set of ROs to the set of preambles. For example, referring to FIG. 6, for each RO (e.g., RO 630, 631) of the set of ROs, all possible preambles (e.g., preamble #1 602, preamble #2 604, preamble #3 606) of the set of preambles map with the RO before mapping a different RO (e.g., RO 632) of the set of ROs to the set of preambles.

In some aspects, the number of ROs in the set of RO for each PRACH repetition may equal the number of PRACH transmissions in the PRACH repetition. For example, referring to FIG. 5, the number of ROs (e.g., six ROs for repetition 6 560) in the set of RO for each PRACH repetition may equal the number of PRACH transmissions (e.g., six PRACH transmissions) in the PRACH repetition.

In some aspects, at 1010, the UE may receive, from the network entity, a first mapping configuration indicative of the set of preambles and mapped ROs for each PRACH repetition of the set of PRACH repetitions. To transmit the set of PRACH repetitions (at 1016), the UE may transmit, based on the set of preambles and the mapped ROs, each PRACH repetition of the set of PRACH repetitions. For example, referring to FIG. 8, at 814, the UE 802 may receive, from the network entity (base station 804), a first mapping configuration indicative of the set of preambles and mapped ROs for each PRACH repetition of the set of PRACH repetitions. For example, referring to FIG. 5, the first mapping configuration may indicate the set of preambles (e.g., preamble #1 512) and mapped ROs (e.g., RO 530, 531, 532, 533, 534, 535). To transmit the set of PRACH repetitions (at 820), the UE may transmit, based on the set of preambles and the mapped ROs, each PRACH repetition of the set of PRACH repetitions. In some aspects, 1010 may be performed by the PRACH repetition component 198.

In some aspects, the PRACH transmissions in the set of PRACH repetitions may include different preambles in the set of preambles based on an order across the set of ROs. For example, referring to FIG. 7, the PRACH transmissions in the set of PRACH repetitions may include different preambles in the set of preambles based on an order across the set of ROs (e.g., preamble #2 704 and preamble #3 706 for repetition 2 720 at RO 730, 731, respectively).

In some aspects, the order includes a linear ascending order or a linear descending order with respect to indices of preamble sequences. For example, referring to FIG. 7, for repetition 2 720, preamble #2 704 at RO 730 and preamble #3 706 RO 731 may follow a linear ascending order with respect to indices of preamble sequences.

In some aspects, the different preambles associated with the PRACH transmissions may be based on a first pattern across the set of ROs. For example, referring to FIG. 7, the first pattern may be preambles across the ROs follow a linear ascending order with respect to indices of preamble sequences.

In some aspects, at 1014, the UE may receive, from the network entity, a pattern indicator for the first pattern across the set of ROs. For example, referring to FIG. 8, at 818, the UE 802 may receive, from the network entity (base station 804), a pattern indicator for the first pattern across the set of ROs. In some aspects, 1014 may be performed by the PRACH repetition component 198.

In some aspects, at 1012, the UE may receive, from the network entity, a number of preambles for each PRACH repetition of the set of PRACH repetitions. For example, referring to FIG. 8, at 816, the UE 802 may receive, from the network entity (base station 804), a number of preambles for each PRACH repetition of the set of PRACH repetitions. For example, referring to FIG. 7, the UE may receive the number of preambles (e.g., four preambles) for each PRACH repetition (e.g., repetition 4 740) of the set of PRACH repetitions. In some aspects, 1012 may be performed by the PRACH repetition component 198.

Figure 11:
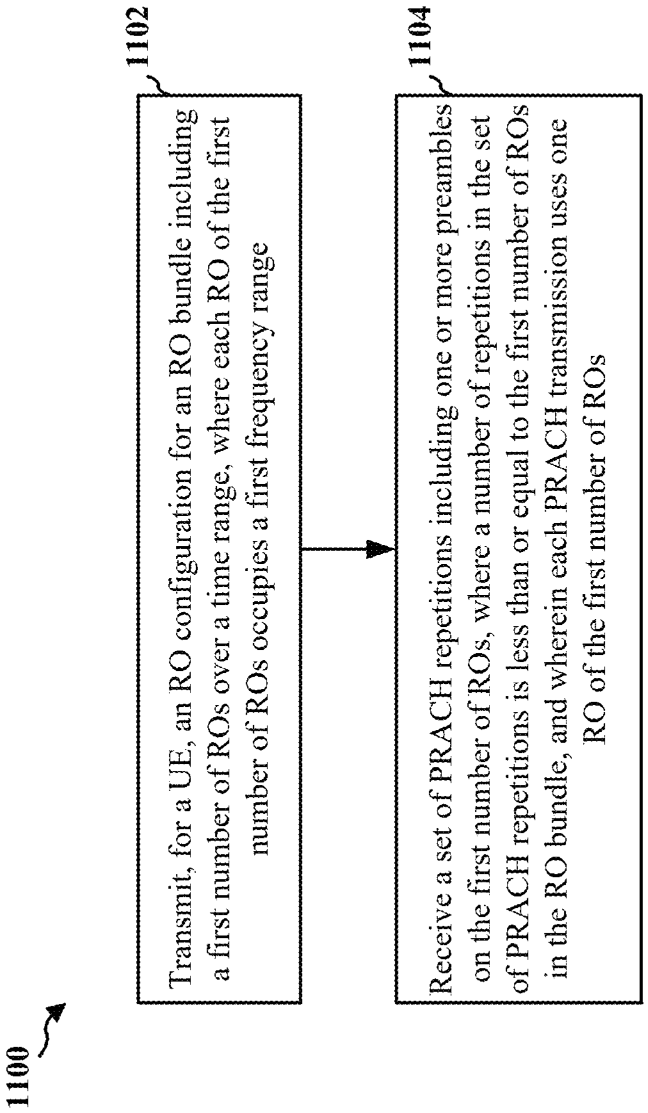
FIG. 11 is a flowchart illustrating methods of wireless communication at a network entity in accordance with various aspects of the present disclosure.

FIG. 11 is a flowchart 1100 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 804; or the network entity 1302 in the hardware implementation of FIG. 13). By grouping ROs into RO bundles and mapping them to SSBs that support multiple preamble sequences, the methods enable more efficient resource utilization, thereby improving overall network efficiency and user experience. Additionally, by using varying preamble sequences across the ROs for PRACH repetitions, the methods generate different interference patterns across the PRACH repetitions, enhancing detection probability and reducing the chances of full collision across the PRACH repetitions.

As shown in FIG. 11, at 1102, the network entity may transmit, for a UE, an RO configuration for an RO bundle including a first number of ROs over a time range. Each RO of the first number of ROs may occupy a first frequency range. The UE may be the UE 104, 350, 802, or the apparatus 1304 in the hardware implementation of FIG. 13. FIG. 4, FIG. 5, FIG. 6, FIG. 7, and FIG. 8 illustrate various aspects of the steps in connection with flowchart 1100. For example, referring to FIG. 8, at 806, the network entity (base station 804) may transmit, for a UE 802, an RO configuration for an RO bundle including a first number of ROs over a time range. Each RO of the first number of ROs may occupy a first frequency range. In some aspects, 1102 may be performed by the PRACH repetition component 199.

At 1104, the network entity may receive a set of PRACH repetitions including one or more preambles on the first number of ROs. The number of repetitions in the set of PRACH repetitions may be less than or equal to the first number of ROs in the RO bundle, and each PRACH transmission may use one RO of the first number of ROs. For example, referring to FIG. 8, at 820, the network entity (base station 804) may receive a set of PRACH repetitions including one or more preambles on the first number of ROs. The number of repetitions in the set of PRACH repetitions may be less than or equal to the first number of ROs in the RO bundle, and each PRACH transmission may use one RO of the first number of ROs. In some aspects, 1104 may be performed by the PRACH repetition component 199.

Figure 12:
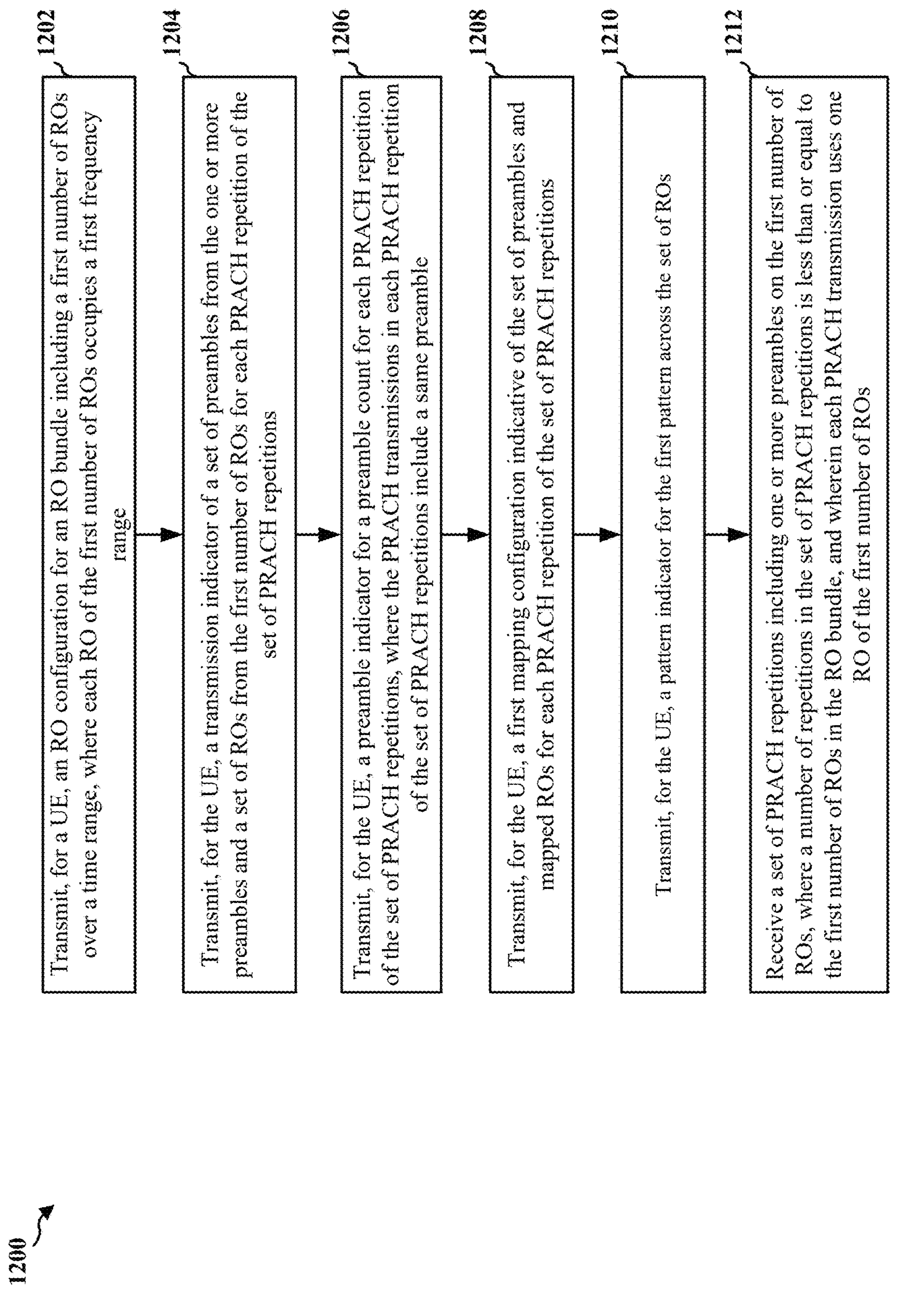
FIG. 12 is a flowchart illustrating methods of wireless communication at a network entity in accordance with various aspects of the present disclosure.

FIG. 12 is a flowchart 1200 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 804; or the network entity 1302 in the hardware implementation of FIG. 13). By grouping ROs into RO bundles and mapping them to SSBs that support multiple preamble sequences, the methods enable more efficient resource utilization, thereby improving overall network efficiency and user experience. Additionally, by using varying preamble sequences across the ROs for PRACH repetitions, the methods generate different interference patterns across the PRACH repetitions, enhancing detection probability and reducing the chances of full collision across the PRACH repetitions.

As shown in FIG. 12, at 1202, the network entity may transmit, for a UE, an RO configuration for an RO bundle including a first number of ROs over a time range. Each RO of the first number of ROs may occupy a first frequency range. The UE may be the UE 104, 350, 802, or the apparatus 1304 in the hardware implementation of FIG. 13. FIG. 4, FIG. 5, FIG. 6, FIG. 7, and FIG. 8 illustrate various aspects of the steps in connection with flowchart 1200. For example, referring to FIG. 8, at 806, the network entity (base station 804) may transmit, for a UE 802, an RO configuration for an RO bundle including a first number of ROs over a time range. Each RO of the first number of ROs may occupy a first frequency range. In some aspects, 1202 may be performed by the PRACH repetition component 199.

At 1212, the network entity may receive a set of PRACH repetitions including one or more preambles on the first number of ROs. The number of repetitions in the set of PRACH repetitions may be less than or equal to the first number of ROs in the RO bundle, and each PRACH transmission may use one RO of the first number of ROs. For example, referring to FIG. 8, at 820, the network entity (base station 804) may receive a set of PRACH repetitions including one or more preambles on the first number of ROs. The number of repetitions in the set of PRACH repetitions may be less than or equal to the first number of ROs in the RO bundle, and each PRACH transmission may use one RO of the first number of ROs. In some aspects, 1212 may be performed by the PRACH repetition component 199.

In some aspects, each RO in the time range and the first frequency range may correspond to a single SSB. For example, referring to FIG. 4, RO 422, 424, 426, and 428 in RO bundle 420 correspond to a single SSB (e.g., SSB2).

In some aspects, the first number of ROs in the RO bundle may be adjacent over the time range. For example, referring to FIG. 4, RO 422, 424, 426, and 428 in RO bundle 420 may be adjacent over the time range.

In some aspects, a time gap may be provided between ROs in the RO bundle. For example, referring to FIG. 4, in some aspects, a time gap 450 may be provided between ROs in the RO bundle (e.g., between RO 432 and 434 in the RO bundle 430).

In some aspects, at 1204, the network entity may transmit, for the UE, a transmission indicator of a set of preambles from the one or more preambles and a set of ROs from the first number of ROs for each PRACH repetition of the set of PRACH repetitions. To receive the set of PRACH repetitions (at 1212), the network entity may receive, using the set of ROs with mapped preambles, each PRACH repetition of the set of PRACH repetitions. For example, referring to FIG. 8, at 812, the network entity (base station 804) may transmit, for the UE 802, a transmission indicator of a set of preambles from the one or more preambles and a set of ROs from the first number of ROs for each PRACH repetition of the set of PRACH repetitions. To receive the set of PRACH repetitions (at 820), the network entity (base station 804) may receive, using the set of ROs with mapped preambles, each PRACH repetition of the set of PRACH repetitions. In some aspects, 1204 may be performed by the PRACH repetition component 199.

In some aspects, at 1206, the network entity may transmit, for the UE, a preamble indicator for a preamble count for each PRACH repetition of the set of PRACH repetitions. The PRACH transmissions in each PRACH repetition of the set of PRACH repetitions may include a same preamble. For example, referring to FIG. 8, at 810, the network entity (base station 804) may transmit, for the UE 802, a preamble indicator for a preamble count for each PRACH repetition of the set of PRACH repetitions. The PRACH transmissions in each PRACH repetition of the set of PRACH repetitions may include a same preamble. In some aspects, 1206 may be performed by the PRACH repetition component 199.

In some aspects, at 1208, the network entity may transmit, for the UE, a first mapping configuration indicative of the set of preambles and mapped ROs for each PRACH repetition of the set of PRACH repetitions. To receive the set of PRACH repetitions (at 1212), the network entity may receive, based on the set of preambles and the mapped ROs, each PRACH repetition of the set of PRACH repetitions. For example, referring to FIG. 8, at 814, the network entity (base station 804) may transmit, for the UE 802, a first mapping configuration indicative of the set of preambles and mapped ROs for each PRACH repetition of the set of PRACH repetitions. To receive the set of PRACH repetitions (at 820), the network entity may receive, based on the set of preambles and the mapped ROs, each PRACH repetition of the set of PRACH repetitions. In some aspects, 1208 may be performed by the PRACH repetition component 199.

In some aspects, the PRACH transmissions in the set of PRACH repetitions may include different preambles in the set of preambles based on an order across the set of ROs, wherein the order includes a linear ascending order or a linear descending order with respect to preamble indices of the preambles. For example, referring to FIG. 7, the PRACH transmissions in the set of PRACH repetitions may include different preambles in the set of preambles based on an order across the set of ROs (e.g., preamble #2 704 and preamble #3 706 for repetition 2 720 at RO 730, 731, respectively). For example, referring to FIG. 7, for repetition 2 720, preamble #2 704 at RO 730 and preamble #3 706 RO 731 may follow a linear ascending order with respect to indices of preamble sequences.

In some aspects, the different preambles associated with the PRACH transmissions may be based on a first pattern across the set of ROs. For example, referring to FIG. 7, the first pattern may be that preambles across the ROs follow a linear ascending order with respect to indices of preamble sequences.

In some aspects, at 1210, the network entity may transmit, for the UE, a pattern indicator for the first pattern across the set of ROs. For example, referring to FIG. 8, at 818, the network entity (base station 804) may transmit, for the UE 802, a pattern indicator for the first pattern across the set of ROs. In some aspects, 1210 may be performed by the PRACH repetition component 199.

Figure 13:
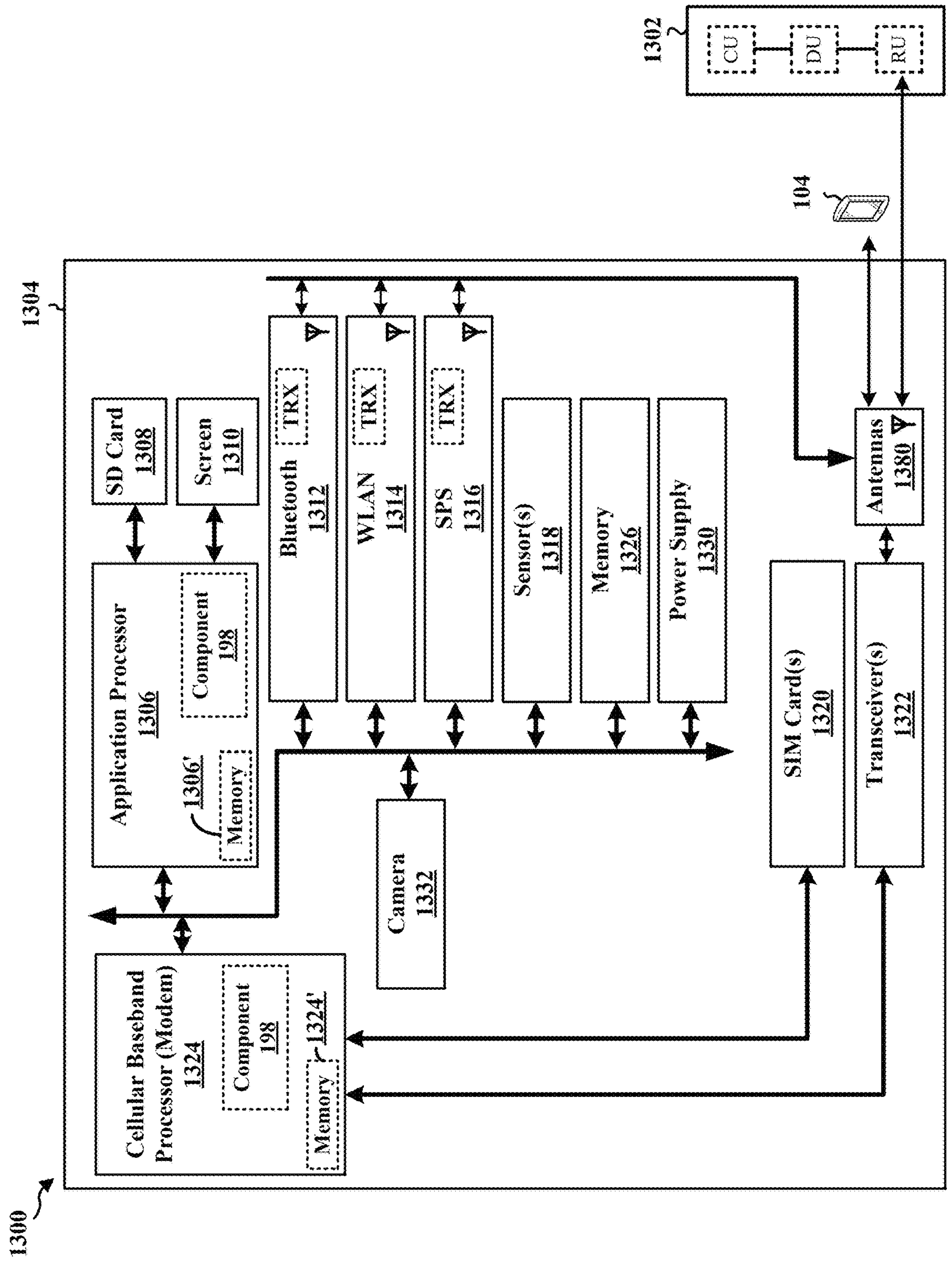
FIG. 13 is a diagram illustrating an example of a hardware implementation for an example apparatus and/or UE.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include at least one cellular baseband processor (or processing circuitry) 1324 (also referred to as a modem) coupled to one or more transceivers 1322 (e.g., cellular RF transceiver). The cellular baseband processor(s) (or processing circuitry) 1324 may include at least one on-chip memory (or memory circuitry) 1324'. In some aspects, the apparatus 1304 may further include one or more subscriber identity modules (SIM) cards 1320 and at least one application processor (or processing circuitry) 1306 coupled to a secure digital (SD) card 1308 and a screen 1310. The application processor(s) (or processing circuitry) 1306 may include on-chip memory (or memory circuitry) 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor(s) (or processing circuitry) 1324 communicates through the transceiver(s) 1322 via one or more antennas 1380 with the UE 104 and/or with an RU associated with a network entity 1302. The cellular baseband processor(s) (or processing circuitry) 1324 and the application processor(s) (or processing circuitry) 1306 may each include a computer-readable medium/memory (or memory circuitry) 1324', 1306', respectively. The additional memory modules 1326 may also be considered a computer-readable medium/memory (or memory circuitry). Each computer-readable medium/memory (or memory circuitry) 1324', 1306', 1326 may be non-transitory. The cellular baseband processor(s) (or processing circuitry) 1324 and the application processor(s) (or processing circuitry) 1306 are each responsible for general processing, including the execution of software stored on the computer-readable medium/memory (or memory circuitry). The software, when executed by the cellular baseband processor(s) (or processing circuitry) 1324/application processor(s) (or processing circuitry) 1306, causes the cellular baseband processor(s) (or processing circuitry) 1324/application processor(s) (or processing circuitry) 1306 to perform the various functions described supra. The cellular baseband processor(s) (or processing circuitry) 1324 and the application processor(s) (or processing circuitry) 1306 are configured to perform the various functions described supra based at least in part of the information stored in the memory (or memory circuitry). That is, the cellular baseband processor(s) (or processing circuitry) 1324 and the application processor(s) (or processing circuitry) 1306 may be configured to perform a first subset of the various functions described supra without information stored in the memory and may be configured to perform a second subset of the various functions described supra based on the information stored in the memory. The computer-readable medium/memory (or memory circuitry) may also be used for storing data that is manipulated by the cellular baseband processor(s) (or processing circuitry) 1324/application processor(s) (or processing circuitry) 1306 when executing software. The cellular baseband processor(s) (or processing circuitry) 1324/application processor(s) (or processing circuitry) 1306 may be a component of the UE 350 and may include the at least one memory 360 and/or at least one of the TX processor 368, the RX processor 356, and the controller/processor 359. In one configuration, the apparatus 1304 may be at least one processor chip (modem and/or application) and include just the cellular baseband processor(s) (or processing circuitry)

1324 and/or the application processor(s) (or processing circuitry) 1306, and in another configuration, the apparatus 1304 may be the entire UE (e.g., see UE 350 of FIG. 3) and include the additional modules of the apparatus 1304.

As discussed supra, the component 198 may be configured to receive, from a network entity, an RO configuration for an RO bundle including a first number of ROs over a time range, where each RO of the first number of ROs occupies a first frequency range; and transmit, using the RO bundle, a set of PRACH repetitions including one or more preambles. The number of repetitions in the set of PRACH repetitions is less than or equal to the first number of ROs in the RO bundle, and each PRACH transmission uses one RO of the first number of ROs. The component 198 may be further configured to perform any of the aspects described in connection with the flowcharts in FIG. 9 and FIG. 10, and/or performed by the UE 802 in FIG. 8. The component 198 may be within the cellular baseband processor(s) (or processing circuitry) 1324, the application processor(s) (or processing circuitry) 1306, or both the cellular baseband processor(s) (or processing circuitry) 1324 and the application processor(s) (or processing circuitry) 1306. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1304 may include a variety of components configured for various functions. In one configuration, the apparatus 1304, and in particular the cellular baseband processor(s) (or processing circuitry) 1324 and/or the application processor(s) (or processing circuitry) 1306, includes means for receiving, from a network entity, an RO configuration for an RO bundle including a first number of ROs over a time range, where each RO of the first number of ROs occupies a first frequency range; and means for transmitting, using the RO bundle, a set of PRACH repetitions including one or more preambles. The number of repetitions in the set of PRACH repetitions is less than or equal to the first number of ROs in the RO bundle, and each PRACH transmission uses one RO of the first number of ROs. The apparatus 1304 may further include means for performing any of the aspects described in connection with the flowcharts in FIG. 9 and FIG. 10, and/or aspects performed by the UE 802 in FIG. 8. The means may be the component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
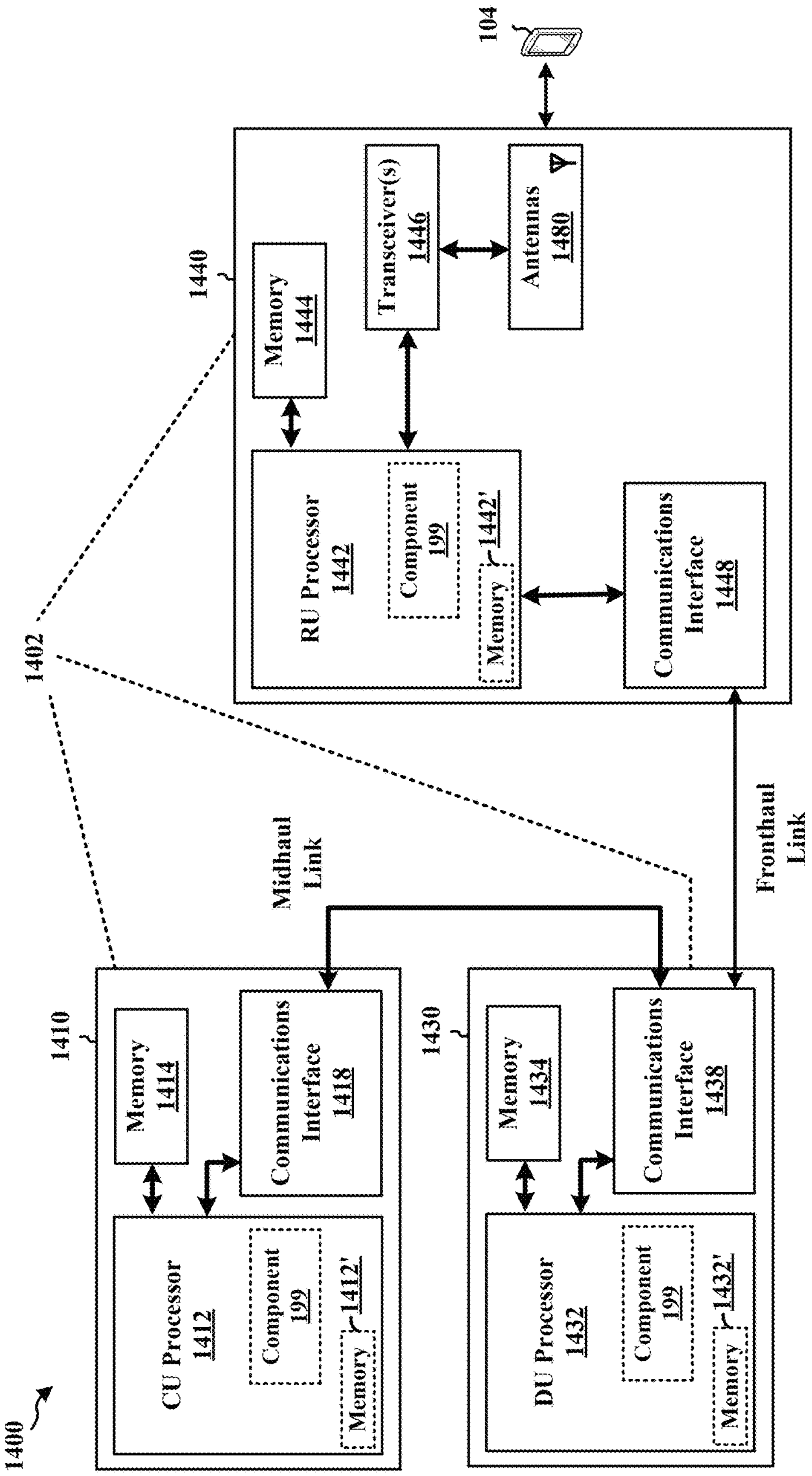
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include at least one CU processor (or processing circuitry) 1412. The CU processor(s) (or processing circuitry) 1412 may include on-chip memory (or memory circuitry) 1412'. In some aspects, the CU 1410 may further include additional memory modules 1414 and a communications interface 1418. The CU 1410 communicates with the DU 1430 through a midhaul link, such as an F1 interface. The DU 1430 may include at least one DU processor (or processing circuitry) 1432. The DU processor(s) (or processing circuitry) 1432 may include on-chip memory (or memory circuitry) 1432'. In some aspects, the DU 1430 may further include additional memory modules 1434 and a communications interface 1438. The DU 1430 communicates with the RU 1440 through a fronthaul link. The RU 1440 may include at least one RU processor (or processing circuitry) 1442. The RU processor(s) (or processing circuitry) 1442 may include on-chip memory (or memory circuitry) 1442'. In some aspects, the RU 1440 may further include additional memory modules 1444, one or more transceivers 1446, antennas 1480, and a communications interface 1448. The RU 1440 communicates with the UE 104. The on-chip memory (or memory circuitry) 1412', 1432', 1442' and the additional memory modules 1414, 1434, 1444 may each be considered a computer-readable medium/memory (or memory circuitry). Each computer-readable medium/memory (or memory circuitry) may be non-transitory. Each of the processors (or processing circuitry) 1412, 1432, 1442 is responsible for general processing, including the execution of software stored on the computer-readable medium/memory (or memory circuitry). The software, when executed by the corresponding processor(s) (or processing circuitry) causes the processor(s) (or processing circuitry) to perform the various functions described supra. The computer-readable medium/memory (or memory circuitry) may also be used for storing data that is manipulated by the processor(s) (or processing circuitry) when executing software.

As discussed supra, the component 199 may be configured to transmit, for a UE, an RO configuration for an RO bundle including a first number of ROs over a time range, where each RO of the first number of ROs occupies a first frequency range; and receive a set of PRACH repetitions including one or more preambles on the first number of ROs. The number of repetitions in the set of PRACH repetitions is less than or equal to the first number of ROs in the RO bundle, and each PRACH transmission uses one RO of the first number of ROs. The component 199 may be further configured to perform any of the aspects described in connection with the flowcharts in FIG. 11 and FIG. 12, and/or performed by the base station 804 in FIG. 8. The component 199 may be within one or more processors (or processing circuitry) of one or more of the CU 1410, DU 1430, and the RU 1440. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1402 may include a variety of components configured for various functions. In one configuration, the network entity 1402 includes means for transmitting, for a UE, an RO configuration for an RO bundle including a first number of ROs over a time range, where each RO of the first number of ROs occupies a first frequency range; and means for receiving a set of PRACH repetitions including one or more preambles on the first number of ROs. The number of repetitions in the set of PRACH repetitions is less than or equal to the first number of ROs in the RO bundle, and each PRACH transmission uses one RO of the first number of ROs. The network entity 1402 may further include means for performing any of the aspects described in connection with the flowcharts in FIG. 11 and FIG. 12, and/or aspects performed by the base station 804 in FIG. 8. The means may be the component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include receiving, from a network entity, an RO configuration for an RO bundle including a first number of ROs over a time range, where each RO of the first number of ROs occupies a first frequency range; and transmitting, using the RO bundle, a set of PRACH repetitions including one or more preambles. The number of repetitions in the set of PRACH repetitions is less than or equal to the first number of ROs in the RO bundle, and each PRACH transmission uses one RO of the first number of ROs. By grouping ROs into RO bundles and mapping them to SSBs that support multiple preamble sequences, the methods enable more efficient resource utilization, thereby improving overall network efficiency and user experience. Additionally, by using varying preamble sequences across the ROs for PRACH repetitions, the methods generate different interference patterns across the PRACH repetitions, enhancing detection probability and reducing the chances of full collision across the PRACH repetitions.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE. The method includes receiving, from a network entity, a random access occasion (RO) configuration for an RO bundle comprising a first number of ROs over a time range, wherein each RO of the first number of ROs occupies a first frequency range; and transmitting, using the RO bundle, a set of physical random access channel (PRACH) repetitions comprising one or more preambles, wherein a number of repetitions in the set of PRACH repetitions is less than or equal to the first number of ROs in the RO bundle, and wherein each PRACH transmission uses one RO of the first number of ROs.

Aspect 2 is the method of aspect 1, wherein each RO in the time range and the first frequency range correspond to a single synchronization signal block (SSB).

Aspect 3 is the method of any of aspects 1 to 2, wherein the first number of ROs in the RO bundle are adjacent over the time range.

Aspect 4 is the method of any of aspects 1 to 2, wherein a time gap is provided between ROs in the RO bundle.

Aspect 5 is the method of any of aspects 1 to 4, where the method further includes determining the number of PRACH transmissions for each PRACH repetition.

Aspect 6 is the method of aspect 5, wherein determining the number of PRACH transmissions includes determining, based on a downlink pathloss measurement, the number of repetitions for the PRACH transmissions.

Aspect 7 is the method of any of aspects 1 to 6, where the method further includes receiving, from the network entity, a transmission indicator of a set of preambles from the one or more preambles and a set of ROs from the first number of ROs for each PRACH repetition of the set of PRACH repetitions, wherein the set of preambles map to the set of ROs for each PRACH repetition of the set of PRACH repetitions. Transmitting the set of PRACH repetitions include transmitting, using the set of ROs with mapped preambles, each PRACH repetition of the set of PRACH repetitions.

Aspect 8 is the method of aspect 7, where the method further includes receiving, from the network entity, a preamble indicator for a preamble count for each PRACH repetition of the set of PRACH repetitions.

Aspect 9 is the method of aspect 8, wherein the PRACH transmissions in each PRACH repetition of the set of PRACH repetitions include a same preamble.

Aspect 10 is the method of aspect 8, wherein, for each preamble of the set of preambles, all possible ROs of the set of ROs map with the preamble before mapping to a different preamble of the set of preambles to the set of ROs.

Aspect 11 is the method of aspect 8, wherein, for each RO of the set of ROs, all possible preambles of the set of preambles map with the RO before mapping a different RO of the set of ROs to the set of preambles.

Aspect 12 is the method of aspect 11, wherein a number of ROs in the set of RO for each PRACH repetition equals the number of PRACH transmissions in the PRACH repetition.

Aspect 13 is the method of aspect 7, where the method further includes receiving, from the network entity, a first mapping configuration indicative of the set of preambles and mapped ROs for each PRACH repetition of the set of PRACH repetitions. Transmitting the set of PRACH repetitions includes transmitting, based on the set of preambles and the mapped ROs, each PRACH repetition of the set of PRACH repetitions.

Aspect 14 is the method of aspect 7, wherein the PRACH transmissions in the set of PRACH repetitions include different preambles in the set of preambles based on an order across the set of ROs.

Aspect 15 is the method of aspect 14, wherein the order includes a linear ascending order or a linear descending order with respect to indices of preamble sequences.

Aspect 16 is the method of aspect 14, wherein the different preambles associated with the PRACH transmissions are based on a first pattern across the set of ROs.

Aspect 17 is the method of aspect 16, where the method further includes receiving, from the network entity, a pattern indicator for the first pattern across the set of ROs.

Aspect 18 is the method of aspect 16, where the method further includes receiving, from the network entity, a number of preambles for each PRACH repetition of the set of PRACH repetitions.

Aspect 19 is an apparatus for wireless communication at a UE, comprising: a processing system that includes processor circuitry and memory circuitry that stores code and is coupled with the processor circuitry, the processing system configured to cause the UE to perform the method of one or more of aspects 1-18.

Aspect 20 is an apparatus for wireless communication at a UE, comprising: at least one memory; and at least one processor coupled to the at least one memory and, where the at least one processor, individually or in any combination, is configured to perform the method of any of aspects 1-18.

Aspect 21 is the apparatus for wireless communication at a UE, comprising means for performing each step in the method of any of aspects 1-18.

Aspect 22 is an apparatus of any of aspects 19-21, further comprising a transceiver configured to receive or to transmit in association with the method of any of aspects 1-18.

Aspect 23 is a computer-readable medium (e.g., a non-transitory computer-readable medium) storing computer executable code at a UE, the code when executed by at least one processor causes the at least one processor to, individually or in any combination, perform the method of any of aspects 1-18.

Aspect 24 is a method of wireless communication at a network entity. The method includes transmitting, for a user equipment (UE), a random access occasion (RO) configuration for an RO bundle comprising a first number of ROs over a time range, wherein each RO of the first number of ROs occupies a first frequency range; and receiving a set of physical random access channel (PRACH) repetitions comprising one or more preambles on the first number of ROs, wherein a number of repetitions in the set of PRACH repetitions is less than or equal to the first number of ROs in the RO bundle, and wherein each PRACH transmission uses one RO of the first number of ROs.

Aspect 25 is the method of aspect 24, wherein each RO in the time range and the first frequency range correspond to a single synchronization signal block (SSB).

Aspect 26 is the method of any of aspects 24 to 25, wherein the first number of ROs in the RO bundle are adjacent over the time range.

Aspect 27 is the method of any of aspects 24 to 25, wherein a time gap is provided between ROs in the RO bundle.

Aspect 28 is the method of aspect 24, where the method further includes transmitting, for the UE, a transmission indicator of a set of preambles from the one or more preambles and a set of ROs from the first number of ROs for each PRACH repetition of the set of PRACH repetitions. Receiving the set of PRACH repetitions includes receiving, using the set of ROs with mapped preambles, each PRACH repetition of the set of PRACH repetitions.

Aspect 29 is the method of aspect 28, where the method further includes transmitting, for the UE, a preamble indicator for a preamble count for each PRACH repetition of the set of PRACH repetitions, wherein the PRACH transmissions in each PRACH repetition of the set of PRACH repetitions include a same preamble.

Aspect 30 is the method of aspect 28, where the method further includes transmitting, for the UE, a first mapping configuration indicative of the set of preambles and mapped ROs for each PRACH repetition of the set of PRACH repetitions. Receiving the set of PRACH repetitions includes receiving, based on the set of preambles and the mapped ROs, each PRACH repetition of the set of PRACH repetitions.

Aspect 31 is the method of aspect 28, wherein the PRACH transmissions in the set of PRACH repetitions include different preambles in the set of preambles based on an order across the set of ROs, wherein the order includes a linear ascending order or a linear descending order with respect to preamble indices of the preambles.

Aspect 32 is the method of aspect 31, wherein the different preambles associated with the PRACH transmissions are based on a first pattern across the set of ROs.

Aspect 33 is the method of aspect 32, where the method further includes transmitting, for the UE, a pattern indicator for the first pattern across the set of ROs.

Aspect 34 is an apparatus for wireless communication at a network entity, comprising: a processing system that includes processor circuitry and memory circuitry that stores code and is coupled with the processor circuitry, the processing system configured to cause the network entity to perform the method of one or more of aspects 24-33.

Aspect 35 is an apparatus for wireless communication at a network entity, comprising: at least one memory; and at least one processor coupled to the at least one memory and, where the at least one processor, individually or in any combination, is configured to perform the method of any of aspects 24-33.

Aspect 36 is the apparatus for wireless communication at a network entity, comprising means for performing each step in the method of any of aspects 24-33.

Aspect 37 is an apparatus of any of aspects 34-36, further comprising a transceiver configured to receive or to transmit in association with the method of any of aspects 24-33.

Aspect 38 is a computer-readable medium (e.g., a non-transitory computer-readable medium) storing computer executable code at a network entity, the code when executed by at least one processor causes the at least one processor to, individually or in any combination, perform the method of any of aspects 24-33.

What is claimed is:

1. An apparatus for wireless communication at a user equipment (UE), comprising:

at least one memory; and at least one processor coupled to the at least one memory and, based at least in part on information stored in the at least one memory, the at least one processor is configured to cause the UE to:

receive, from a network entity, a random access occasion (RO) configuration for an RO bundle comprising a first number of ROs over a time range, wherein each RO of the first number of ROs occupies a first frequency range and is associated with a single synchronization signal block (SSB);

receive, from the network entity, a transmission indicator of a set of preambles and a set of ROs, from the first number of ROs of the RO bundle, for each physical random access channel (PRACH) repetition of a set of PRACH repetitions, wherein the set of preambles map to the set of ROs for each PRACH repetition of the set of PRACH repetitions; and transmit, using the RO bundle, the set of PRACH repetitions comprising one or more preambles of the set of preambles, wherein a number of repetitions in the set of PRACH repetitions is less than or equal to the first number of ROs in the RO bundle, and wherein each PRACH transmission uses one RO of the first number of ROs based on the set of ROs with mapped preambles.

2. The apparatus of claim 1, further comprising a transceiver coupled to the at least one processor, wherein to receive the RO configuration for the RO bundle, the at least one processor is configured to cause the UE to receive the RO configuration for the RO bundle via the transceiver.

3. The apparatus of claim 2, wherein the first number of ROs in the RO bundle are adjacent over the time range.

4. The apparatus of claim 2, wherein a time gap is provided between ROs in the RO bundle.

5. The apparatus of claim 1, wherein the at least one processor is further configured to cause the UE to:

determine a number of PRACH transmissions for each PRACH repetition.

6. The apparatus of claim 5, wherein to determine the number of PRACH transmissions, the at least one processor is configured to cause the UE to:

determine, based on a downlink pathloss measurement, the number of repetitions for the PRACH transmissions.

7. The apparatus of claim 1, wherein the at least one processor is further configured to cause the UE to:

receive, from the network entity, a preamble indicator for a preamble count for each PRACH repetition of the set of PRACH repetitions.

8. The apparatus of claim 7, wherein the PRACH transmission in each PRACH repetition of the set of PRACH repetitions include a same preamble.

9. The apparatus of claim 7, wherein for each preamble of the set of preambles, all possible ROs of the set of ROs map with the preamble before mapping to a different preamble of the set of preambles to the set of ROs.

10. The apparatus of claim 7, wherein, for each RO of the set of ROs, all possible preambles of the set of preambles map with the RO before mapping a different RO of the set of ROs to the set of preambles.

11. The apparatus of claim 10, wherein a number of ROs in the set of ROs equals the number of repetitions.

12. The apparatus of claim 1, wherein the at least one processor is configured to cause the UE to:

receive, from the network entity, a first mapping configuration indicative of the set of preambles and mapped ROs for each PRACH repetition of the set of PRACH repetitions, wherein to transmit the set of PRACH repetitions, the at least one processor is configured to cause the UE to:

transmit, based on the set of preambles and the mapped ROs, each PRACH repetition of the set of PRACH repetitions.

13. The apparatus of claim 1, wherein the PRACH transmissions in the set of PRACH repetitions include different preambles in the set of preambles based on an order across the set of ROs.

14. The apparatus of claim 13, wherein the order includes a linear ascending order or a linear descending order with respect to indices of preamble sequences.

15. The apparatus of claim 13, wherein the different preambles associated with the PRACH transmissions are based on a first pattern across the set of ROs.

16. The apparatus of claim 15, wherein the at least one processor is configured to cause the UE to:

receive, from the network entity, a pattern indicator for the first pattern across the set of ROs.

17. The apparatus of claim 15, wherein the at least one processor is further configured to cause the UE to:

receive, from the network entity, a number of preambles for each PRACH repetition of the set of PRACH repetitions.

18. A method of wireless communication at a user equipment (UE), comprising:

receiving, from a network entity, a random access occasion (RO) configuration for an RO bundle comprising a first number of ROs over a time range, wherein each RO of the first number of ROs occupies a first frequency range and is associated with a single synchronization signal block (SSB);

receiving, from the network entity, a transmission indicator of a set of preambles and a set of ROs, from the first number of ROs of the RO bundle, for each physical random access channel (PRACH) repetition of a set of PRACH repetitions, wherein the set of preambles map to the set of ROs for each PRACH repetition of the set of PRACH repetitions; and transmitting, using the RO bundle, the set of PRACH repetitions comprising one or more preambles of the set of preambles, wherein a number of repetitions in the set of PRACH repetitions is less than or equal to the first number of ROs in the RO bundle, and wherein each PRACH transmission uses one RO of the first number of ROs based on the set of ROs with mapped preambles.

19. An apparatus of wireless communication at a network entity, comprising:

at least one memory; and at least one processor coupled to the at least one memory and, based at least in part on information stored in the at least one memory, the at least one processor is configured to cause the network entity to:

transmit, for a user equipment (UE), a random access occasion (RO) configuration for an RO bundle comprising a first number of ROs over a time range, wherein each RO of the first number of ROs occupies a first frequency range and is associated with a single synchronization signal block (SSB);

transmit a transmission indicator of a set of preambles and a set of ROs, from the first number of ROs of the RO bundle, for each physical random access channel (PRACH) repetition of a set of PRACH repetitions, wherein the set of preambles map to the set of ROs for each PRACH repetition of the set of PRACH repetitions; and receive the set of PRACH repetitions comprising one or more preambles of the set of preambles on the first number of ROs, wherein a number of repetitions in the set of PRACH repetitions is less than or equal to the first number of ROs in the RO bundle, and wherein each PRACH transmission uses one RO of the first number of ROs based on the set of ROs with mapped preambles.

20. The apparatus of claim 19, further comprising a transceiver coupled to the at least one processor, wherein to transmit the RO configuration for the RO bundle, the at least one processor is configured to cause the network entity to transmit the RO configuration for the RO bundle via the transceiver.

21. The apparatus of claim 20, wherein the first number of ROs in the RO bundle are adjacent over the time range.

22. The apparatus of claim 20, wherein a time gap is provided between ROs in the RO bundle.

23. The apparatus of claim 19, wherein the at least one processor is further configured to cause the network entity to:

transmit, for the UE, a preamble indicator for a preamble count for each PRACH repetition of the set of PRACH repetitions, wherein the PRACH transmission in each PRACH repetition of the set of PRACH repetitions include a same preamble.

24. The apparatus of claim 19, wherein the at least one processor is configured to cause the network entity to:

transmit, for the UE, a first mapping configuration indicative of the set of preambles and mapped ROs for each PRACH repetition of the set of PRACH repetitions, wherein to receive the set of PRACH repetitions, the at least one processor is configured to cause the network entity to:

receive, based on the set of preambles and the mapped ROs, each PRACH repetition of the set of PRACH repetitions.

25. The apparatus of claim 19, wherein PRACH transmissions in the set of PRACH repetitions include different preambles in the set of preambles based on an order across the set of ROs, wherein the order includes a linear ascending order or a linear descending order with respect to preamble indices of the set of preambles.

26. The apparatus of claim 25, wherein the different preambles associated with the PRACH transmissions are based on a first pattern across the set of ROs.

27. The apparatus of claim 26, wherein the at least one processor is further configured to cause the network entity to:

transmit, for the UE, a pattern indicator for the first pattern across the set of ROs.

28. A method of wireless communication at a network entity, comprising:

transmitting, for a user equipment (UE), a random access occasion (RO) configuration for an RO bundle comprising a first number of ROs over a time range, wherein each RO of the first number of ROs occupies a first frequency range and is associated with a single synchronization signal block (SSB);

transmitting a transmission indicator of a set of preambles and a set of ROs, from the first number of ROs of the RO bundle, for each physical random access channel (PRACH) repetition of a set of PRACH repetitions, wherein the set of preambles map to the set of ROs for each PRACH repetition of the set of PRACH repetitions; and receiving the set of PRACH repetitions comprising one or more preambles of the set of preambles on the first number of ROs, wherein a number of repetitions in the set of PRACH repetitions is less than or equal to the first number of ROs in the RO bundle, and wherein each PRACH transmission uses one RO of the first number of ROs based on the set of ROs with mapped preambles.

* * * * *